(12) United States Patent
Shaikh et al.

(10) Patent No.: US 10,436,506 B2
(45) Date of Patent: *Oct. 8, 2019

(54) SUPERSONIC SEPARATION OF HYDROCARBONS

(71) Applicant: EASTMAN CHEMICAL COMPANY, Kingsport, TN (US)

(72) Inventors: Ashfaq Shahanawaz Shaikh, Kingsport, TN (US); Anthony Ponder, Kingsport, TN (US); Ginette Tolleson, Kingsport, TN (US)

(73) Assignee: EASTMAN CHEMICAL COMPANY, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/060,674

(22) PCT Filed: Dec. 8, 2016

(86) PCT No.: PCT/US2016/065551
§ 371 (c)(1),
(2) Date: Jun. 8, 2018

(87) PCT Pub. No.: WO2017/112420
PCT Pub. Date: Jun. 29, 2017

(65) Prior Publication Data
US 2018/0363979 A1 Dec. 20, 2018

Related U.S. Application Data

(60) Provisional application No. 62/271,074, filed on Dec. 22, 2015.

(51) Int. Cl.
*B01D 5/00* (2006.01)
*F25J 3/00* (2006.01)
(Continued)

(52) U.S. Cl.
CPC .............. *F25J 3/0242* (2013.01); *B01D 3/06* (2013.01); *B01D 3/148* (2013.01); *B01D 5/00* (2013.01);
(Continued)

(58) Field of Classification Search
None
See application file for complete search history.

(56) References Cited

U.S. PATENT DOCUMENTS 3,559,373 A 2/1971 Garret
4,278,457 A 7/1981 Campbell et al.
(Continued)

FOREIGN PATENT DOCUMENTS

| GB | 1103130 A | * 2/1968 | ............. B01D 45/16 |
|---|---|---|---|
| WO | WO 2012/099510 A1 | 7/2012 | |

OTHER PUBLICATIONS

"International Search Report and Written Opinion of the International Searching Authority", dated Feb. 28, 2017 in connection with PCT/US16/65551.

(Continued)

*Primary Examiner* — Philip Y Louie
(74) *Attorney, Agent, or Firm* — Kramer Amado, P.C.

(57) ABSTRACT

Selective recovery of C2 to C4 hydrocarbons is achieved through the use of a converging-diverging nozzle, or de Laval nozzle. The vapor stream comprising C2 to C4 hydrocarbons is fed into an inlet of a de Laval nozzle having a throat. The vapor stream may have an initial temperature of between 0° C. and 100° C., and an initial pressure of between 200 psig and 500 psig. In the de Laval nozzle, the vapor stream expands after passing through the throat of the de Laval nozzle, producing a vapor stream having reduced temperature and pressure. Then, C2 to C4 hydrocarbons condense from the reduced-temperature vapor stream as (Continued)

liquid droplets, which may be recovered. Fractionation of C2 to C4 hydrocarbons by means of a de Laval nozzle is possible; the technique allows selective recovery of a stream enriched in propene from a mixture of propane and propene.

19 Claims, 16 Drawing Sheets

(51) Int. Cl.
    *F25J 3/02* (2006.01)
    *B01D 53/24* (2006.01)
    *B01D 3/06* (2006.01)
    *B01D 53/00* (2006.01)
    *B01D 3/14* (2006.01)
    *C10G 70/00* (2006.01)
    *B01D 53/22* (2006.01)

(52) U.S. Cl.
    CPC ........... *B01D 5/006* (2013.01); *B01D 53/002* (2013.01); *B01D 53/24* (2013.01); *C10G 70/00* (2013.01); *F25J 3/0209* (2013.01); *F25J 3/0219* (2013.01); *F25J 3/0233* (2013.01); *F25J 3/0238* (2013.01); *B01D 53/229* (2013.01); *B01D 2256/16* (2013.01); *B01D 2256/24* (2013.01); *B01D 2257/7022* (2013.01); *B01D 2257/7025* (2013.01); *F25J 2200/02* (2013.01); *F25J 2240/40* (2013.01); *Y02C 20/20* (2013.01); *Y02P 70/34* (2015.11)

(56) References Cited

U.S. PATENT DOCUMENTS

| 4,579,565 | A | 4/1986 | Heath |
| 6,293,999 | B1 | 9/2001 | Cheng et al. |
| 6,363,744 | B2 | 4/2002 | Finn et al. |
| 6,372,019 | B1 * | 4/2002 | Alferov ................. B04C 3/00 95/29 |
| 6,560,989 | B1 | 5/2003 | Roberts et al. |
| 6,776,825 | B2 | 8/2004 | Betting et al. |
| 2002/0189443 | A1 * | 12/2002 | McGuire ............... B01D 53/24 95/32 |
| 2006/0213652 | A1 | 9/2006 | Shaposhnikov et al. |
| 2010/0180952 | A1 | 7/2010 | Verhelst et al. |
| 2011/0056457 | A1 | 3/2011 | Livshits et al. |
| 2013/0019612 | A1 | 6/2013 | Favilli et al. |
| 2014/0008063 | A1 | 1/2014 | Prentice, III |

OTHER PUBLICATIONS

International Search Report dated Mar. 27, 2017 for PCT/US16/65541.

\* cited by examiner

SUPERSONIC SEPARATION OF HYDROCARBONS

BACKGROUND

1. Field of the Invention

This disclosure relates generally to recovering and/or recycling reactive hydrocarbon gases by condensation.

2. Description of Related Art

A de Laval nozzle, or convergent-divergent nozzle, is a tube that is pinched in the middle, and has an axisymmetric hourglass shape. De Laval nozzles are used to accelerate pressurized gases at low speed to a higher speed, more particularly a supersonic speed in the axial direction, by converting the heat energy of the flow into kinetic energy. Because of this, the nozzle is used in steam turbines, rocket engine nozzles, and supersonic jet engines.

Operation of a de Laval nozzle depends on changing properties in a gas as it accelerates from subsonic to supersonic speeds. The speed of a subsonic flow of gas will increase if the pipe carrying it narrows because the mass flow rate is constant. The gas flow through a de Laval nozzle is normally isentropic. At the "throat," where the cross-sectional area is at its minimum and flow is choked, the gas velocity reaches Mach 1. As the nozzle cross-sectional area increases, the gas expands, and the gas velocity becomes supersonic. Under conditions of supersonic flow at constant, or nearly constant, entropy, the gas temperature decreases and the gas pressure decreases.

As the gas temperature decreases, gases within the stream may condense and form a liquid or solid phase. By inducing swirl in the gas flow, the condensed phase may be driven by centrifugal force to the wall of the nozzle, and recovered through an opening at the nozzle wall or in a flow pipe leading away from the nozzle. Such techniques have been used to remove water from methane streams, e.g., natural gas. The current application is directed to removing water from higher-boiling hydrocarbon streams, and/or effectively separating C2 to C4 hydrocarbons under supersonic conditions.

Such separations are illustrative of those that can be achieved by the various embodiments disclosed herein, and are not intended to be exhaustive or limiting of the possible advantages that can be realized. Thus, these and other embodiments will be apparent from the description herein or can be learned from practicing the various exemplary embodiments, both as embodied herein or as modified in view of any variation that may be apparent to those skilled in the art. Accordingly, the present invention is exemplified by, but not limited to, the methods, arrangements, combinations, and improvements herein shown and described.

SUMMARY OF THE DISCLOSURE

In light of the present need for improved methods of recovering and/or recycling volatile hydrocarbon gases, a brief summary of various embodiments is presented. Some simplifications and omissions may be made in the following summary, which is intended to highlight and introduce some aspects of the various exemplary embodiments, but not to limit the scope of the invention. Detailed descriptions of exemplary embodiments adequate to allow those of ordinary skill in the art to make and use the inventive concepts will follow in later sections.

Supersonic separation methods operate by accelerating a gas mixture to supersonic speeds by passing the mixture through a converging-diverging nozzle. The expansion process lowers the temperature and pressure of the gas mixture. If the partial pressure of a condensable component in the vapor is decreased below the vapor pressure of that component at the local temperature, homogeneous nucleation can commence, initiating the formation of small droplets of the condensate that may then grow via condensation and coagulation mechanisms. These droplets are typically very small (of the order of 0.1 microns) and generally travel with the speed of the gas. To collect these droplets, supersonic separators utilize swirl vanes and other devices to induce centripetal acceleration of the droplets toward the nozzle walls, where they may be captured. The swirling devices also increase local turbulence levels within the separator, greatly increasing the probability of droplet-droplet collisions which lead to larger droplet volumes and enhanced potential for collection.

In various embodiments disclosed herein, a stream of gases or a mixture of gas and vapor passes through a de Laval nozzle. At the throat of the de Laval nozzle, the gas velocity reaches sonic velocity, i.e., the velocity c=Mach 1. Prior to entering the throat, gas velocity c is subsonic, while after exiting the throat, gas velocity c is supersonic. As the gas leaves the nozzle at supersonic speed, both pressure and temperature fall.

Various embodiments of the disclosed process are used for gas separation. In particular, the process is directed towards condensing C3 and/or C4 hydrocarbons and other heavy components from a gas stream comprising C1 to C4 hydrocarbons, methane, oxygenated compounds (propanols, butyraldehydes, etc.), and various inorganic gases using a Laval nozzle.

In embodiments directed to gas separation, a stream of gases or a mixture of gas and vapor passes through a de Laval nozzle, and accelerates to supersonic speed (c>Mach 1). As the gas leaves the nozzle at supersonic speed, both pressure and temperature fall. Gases derived from lower boiling materials condense as a liquid, and high-boiling gases are recovered as gases. The stream of gases is subjected to a vortex chamber or similar device, which causes vapors to swirl around a central axis as they leave the nozzle; centrifugal forces aid in separation of condensed gases from the gas or vapor stream.

Various embodiments relate to treatment of C3 hydrocarbons, including propene (propylene) gas, from a purge stream from a hydroformylation reaction process, where propene gas reacts with hydrogen and carbon monoxide to produce butyraldehydes.

Various embodiments disclosed herein are directed to a method of selectively recovering hydrocarbons with a boiling point of between −105° C. and 5° C. from a vapor stream. In some embodiments, the vapor stream may contain, based on the total weight of the hydrocarbon gases:

from 50% to 100% C3 hydrocarbons, from 70 to 100% C3 hydrocarbons, from 85 to 100% C3 hydrocarbons, or from 85% to 98% C3 hydrocarbons; and from 0% to 10% methane, from 0.5% to 5% methane; or from 1% to 3% methane;

with the balance being C2 and C4 hydrocarbons.

In some embodiments, the vapor stream may contain, based on the total weight of the hydrocarbon gases:

from 50% to 100% C4 hydrocarbons, from 70 to 100% C4 hydrocarbons, from 85 to 100% C4 hydrocarbons, or from 85% to 98% C4 hydrocarbons; and from 0% to 10% methane, from 0.5% to 5% methane; or from 1% to 3% methane;

with the balance being C2 and C3 hydrocarbons.

In some embodiments, the vapor stream may contain greater than 50%, greater than 70%, or greater than 85% C2 hydrocarbons; and less than 10%, less than 5%, or less than 3% methane, with the balance being C3 and C4 hydrocarbons.

In various embodiments, the method comprises passing a vapor stream comprising hydrocarbons with a boiling point of between −105° C. and 5° C. into an inlet of a de Laval nozzle having a throat, said vapor stream having an initial temperature of between 0° C. and 100° C. and an initial pressure of between 200 psig and 500 psig; an initial temperature of between 0° C. and 60° C. and an initial pressure of between 250 psig and 400 psig; or an initial temperature of between 0° C. and 40° C. and an initial pressure of between 275 psig and 325 psig;
expanding the vapor stream after the vapor stream passes through the throat of the de Laval nozzle, producing a reduced-temperature vapor stream;
condensing hydrocarbons with a boiling point of between −105° C. and 5° C. from the reduced-temperature vapor stream as liquid droplets; and
recovering the liquid droplets of condensed hydrocarbons from the vapor stream. In various embodiments, the liquid droplets have a mean diameter of between $1.75 \times 10^{-6}$ m and $2.5 \times 10^{-6}$ m.

In various embodiments, there is a step of inducing swirling flow in the vapor stream, either prior to expanding the vapor stream, or after expansion, but before recovering the liquid droplets. During the recovery step, the swirling flow drives the liquid droplets toward the wall of the de Laval nozzle, or toward the wall of a pipe connected to an exit of said de Laval nozzle, by centrifugal force.

In various embodiments, the initial vapor stream comprises hydrocarbons with a boiling point of between −40° C. and −60° C., i.e., propane, propene, and mixtures thereof, in an amount of between 85% and 100% by weight of the hydrocarbon gases. In other embodiments, the initial vapor stream comprises hydrocarbons with a boiling point of between −20° C. and 5° C., i.e., saturated C4 hydrocarbons, unsaturated C4 hydrocarbons, and mixtures thereof, in an amount of between 70% and 100% by weight of the hydrocarbon gases. In some embodiments, the initial vapor stream comprises hydrocarbons with a boiling point of between −105° C. and −85° C., i.e., ethane, ethane (ethylene), and mixtures thereof, in an amount of between 50% and 100% by weight of the hydrocarbon gases.

In addition to hydrocarbon gases, the vapor stream may comprise hydrogen, carbon monoxide, carbon dioxide, and various inert inorganic gases. In various embodiments, the vapor stream may comprise oxygenated organic compounds. For example, the vapor stream may be a waste gas from a hydroformylation reactor where propene is converted into butyraldehyde. In such a case, the waste gas stream would comprise both unreacted propene and C4 aldehyde products. In a case where C3 hydrocarbons, for example, comprise between 85% and 100% by weight of the hydrocarbon gases, they may only comprise between 22% and 78% by weight of the total vapor stream, including inert gases and oxygenated compounds.

Various embodiments disclosed herein relate to a method of recovering C2 to C4 hydrocarbons in a waste gas stream from a chemical reactor, by passing the waste gas stream into an inlet of a de Laval nozzle having a throat, where the waste gas stream has an initial temperature of between 0° C. and 100° C., between 0° C. and 60° C., or between 0° C. and 40° C., and an initial pressure of between 200 psig and 500 psig, between 250 psig and 400 psig, or between 275 psig and 325 psig;
expanding the waste gas stream after the vapor stream passes through the throat of the de Laval nozzle, producing a reduced-temperature stream;
condensing C2 to C4 hydrocarbons from the reduced-temperature stream as liquid droplets; and recovering the liquid droplets of condensed C2 to C4 hydrocarbon gases from said reduced-temperature stream.

The C2 to C4 hydrocarbons may be saturated hydrocarbons, unsaturated hydrocarbons, or a mixture thereof. At least a portion of the recovered C2 to C4 hydrocarbons may be fed to the chemical reactor as a reactant.

In various embodiments, the C2 to C4 hydrocarbons comprise C2 to C4 unsaturated hydrocarbons, and are recovered from a waste gas stream from a hydroformylation reactor. If the waste gas stream is derived from a hydroformylation reactor, the waste gas stream may comprise C3 to C5 oxygenated compounds, particularly aldehydes, in addition to C2 to C4 hydrocarbon gases. In such a case, the method may further comprise a step of condensing the oxygenated compounds from said waste gas stream prior to passing the waste gas stream into the inlet of the de Laval nozzle so as to prevent contamination of the condensed hydrocarbon gases by the oxygenated compounds. Alternatively, a waste gas stream comprising C2 to C4 hydrocarbon gases and vapor-phase C3 to C5 oxygenated compounds may be treated by expansion in a de Laval nozzle to condense droplets comprising hydrocarbons and C3 to C5 oxygenated compounds. The resulting condensed mixture may be distilled to recover volatile hydrocarbons as an overhead stream.

In various embodiments, the C2 to C4 hydrocarbons are recovered from a waste gas stream from a gas phase polymerization reactor, and comprise C2 to C4 unsaturated reactant hydrocarbons, e.g., ethene, propene, and/or butenes. The waste gas stream may additionally comprise low molecular weight oligomers having a boiling point of between 5° C. and 100° C., e.g., dimers, trimers, and/or tetramers. If the waste gas stream comprises C2 to C4 reactant hydrocarbons and oligomers, the method of recovering C2 to C4 hydrocarbons may further comprise a step of condensing hydrocarbons having a boiling point of between 5° C. and 100° C. from the waste gas stream prior to passing the waste gas stream into the inlet of the de Laval nozzle.

In various embodiments, the initial vapor stream comprises hydrocarbons, i.e., propane, propene, and mixtures thereof, in an amount of between 85% and 100% by weight of the hydrocarbon gases.

In other embodiments, the initial vapor stream comprises hydrocarbons, i.e., saturated C4 hydrocarbons, unsaturated C4 hydrocarbons, and mixtures thereof, in an amount of between 70% and 100% A by weight of the hydrocarbon gases. In some embodiments, the initial vapor stream comprises hydrocarbons, i.e., ethane, ethene, and mixtures thereof, in an amount of between 50% and 100% by weight of the hydrocarbon gases.

The recovered liquid C2 to C4 hydrocarbons may be fractionated by distillation to produce a first fraction of C2 hydrocarbons with a boiling point of between −105° C. and −85° C.; a second fraction of C3 hydrocarbons with a boiling point of between −40° C. and −60° C.; and a third fraction of C4 hydrocarbons with a boiling point of between −20° C. and 5° C. Where the waste gas is derived from a chemical reactor for production of butyraldehyde by hydroformylation or for production of polypropene, at least a portion of second fraction of C3 hydrocarbons may be recycled to the chemical hydroformylation reactor as a reactant. The C2 and C4 fractions may be fed to a cracking plant or an incinerator.

Alternatively, the C3 fraction boiling between −40° C. and −60° C. may undergo further fractionation to produce a propane-rich fraction and a propene-rich fraction. This may be done by selective adsorption of propene onto a zeolite molecular sieve, or by distillation. If the initial feed stream contains from 85% to 100% C3 hydrocarbon gases based on the total weight of the hydrocarbon gases, fractionation of gases condensed in the de Laval nozzle into a propane-rich fraction and a propene-rich fraction may be performed without requiring an initial fractionation into a first fraction of C2 hydrocarbons; a second fraction of C3 hydrocarbons; and a third fraction of C4 hydrocarbons. The propene-rich fraction may be used as a reactant feed stream in a chemical reactor, such as a hydroformylation reactor or a gas phase polymerization reactor. The propane-rich fraction may be used as a feed stream for a cracking plant or an incinerator.

If the initial vapor stream is a waste gas from a chemical reaction using propene as a starting material, e.g., hydroformylation of propene to produce butyraldehyde or gasphase propene polymerization, the propene-rich fraction may be recycled to the reaction vessel as a starting material.

Various embodiments disclosed herein relate to a method of recycling C3 hydrocarbons in a waste gas stream from a chemical reactor, e.g., a hydroformylation or polymerization reactor. The method involves passing a waste gas stream comprising C3 hydrocarbons into an inlet of a de Laval nozzle having a throat, said waste gas stream having an initial temperature of between 0° C. and 100° C. and an initial pressure of between 200 psig and 500 psig;
expanding the waste gas stream after the vapor stream passes through the throat of the de Laval nozzle, producing a reduced-temperature stream;
condensing a first portion of the C3 hydrocarbons from the reduced-temperature stream as a liquid, wherein about 12% by weight and about 40% by weight of the C3 hydrocarbons in the initial feed stream are condensed from the reduced-temperature stream as a liquid;
allowing non-condensed gases to exit the de Laval nozzle; and
recovering the first portion from said reduced-temperature stream.

In some embodiments, the method further comprises passing said non-condensed gases into an inlet of a second de Laval nozzle having a throat, said non-condensed gases having an initial temperature of between 0° C. and 100° C. and an initial pressure of between 200 psig and 500 psig;
expanding the non-condensed gases in the second de Laval nozzle;
condensing a second portion of said C3 hydrocarbons from the expanded non-condensed gases as a liquid, wherein between about 12% by weight and about 40% by weight of said C3 hydrocarbons in the non-condensed gases are condensed as the second portion; and
recovering the second portion of said liquid C3 hydrocarbons. Non-condensed gases exiting an outlet of the second de Laval nozzle may comprise further C3 hydrocarbons, and may be passed to at least a third de Laval nozzle for further C3 hydrocarbon recovery, if desired. Hydrocarbon recovery may thus be accomplished by passing a gas with condensable hydrocarbon gases, e.g., C2 to C4 gases, preferably C3 gases, through two de Laval nozzles in sequence, through three de Laval nozzles in sequence, or through four or more de Laval nozzles in sequence.

In various embodiments, the method further comprises:
feeding at least a part of the first portion to the chemical reactor as a reactant;
feeding at least a part of the second portion to the chemical reactor as a reactant; or
mixing the first portion and the second portion to make a mixture, and feeding at least a part of the mixture to the chemical reactor as a reactant.

In various embodiments, the method further comprises:
fractionating the first portion into a propane-rich fraction and a propene-rich fraction; and
feeding at least a part of the propene-rich fraction to the chemical reactor as a reactant; or
mixing the first portion and the second portion to make a mixture, fractionating the mixture into a propane-rich fraction and a propene-rich fraction; and
feeding the propene-rich fraction of the mixture to the chemical reactor as a reactant.

In various embodiments, the disclosure relates to a method of at least partially separating a first hydrocarbon from a mixture of the first hydrocarbon and a second hydrocarbon, where the mixture has a defined critical pressure. The method comprises:
passing a gas stream comprising the mixture of the first and second hydrocarbons into an inlet of a de Laval nozzle having a throat, where the gas stream has an initial temperature of between −100° C. and 150° C. and an initial pressure of between 200 psig and the critical pressure of the mixture;
expanding the gas stream after the gas stream passes through the throat of the de Laval nozzle, producing a reduced-temperature gas stream;
condensing a first enriched liquid from the reduced-temperature gas stream, wherein said first enriched liquid is enriched in said first hydrocarbon, relative to the mixture of the first and second hydrocarbons; and
recovering the first enriched liquid from the gas stream.

Each gas or gas mixture has a defined critical point, with a critical temperature and a critical pressure. For example, propane has a critical temperature of 96.74° C., and a critical pressure of 42.51 bar. The gas or gas mixture may be fed into a de Laval nozzle at an initial pressure which is between about 200 psig (13.8 bar) and the critical pressure of the gas. The gas or gas mixture may be fed into the de Laval nozzle of between −100° C. and 150° C. As long as the gas pressure is below the critical pressure, the gas temperature may exceed the critical temperature. If both the gas pressure is above the critical pressure and the gas temperature is above the critical temperature, the gas becomes a supercritical fluid. If the gas pressure is above the critical pressure and the gas temperature is below the critical temperature, the gas becomes a compressible liquid.

In various embodiments, the first hydrocarbon has a first boiling point $T_1$ at atmospheric pressure and said second hydrocarbon has a second boiling point $T_2$ at atmospheric pressure; where $T_1 \leq T_2$. If the first and second hydrocarbons have similar boiling points, the mixture of the first and second hydrocarbons may comprise between 60% by volume and 90% by volume, between 65% by volume and 85% by volume, or between 70% by volume and 80% by volume of one of the first and second hydrocarbons, and between 10% by volume and 40% by volume of the other of the first and second hydrocarbons; between 15% by volume and 35% by volume, or between 20% by volume and 30% by volume of the other of the first and second hydrocarbons.

Similar boiling points are here defined to mean that $T_1 \leq T_2 \leq T_1 + 15$ K, or that $T_1 \leq T_2 \leq T_1 + 10$ K. Examples of gases with similar boiling points include propene and propane, or 1-butene and butane. If the gases have similar boiling points, the condensate from the de Laval nozzle may or not be enriched in the gas with the higher boiling point. If the gas with the lower boiling point has the higher vapor pressure in the de Laval nozzle, the condensate from the de Laval nozzle is enriched in the gas with the lower boiling point. For example, under the proper conditions, it is possible to preferentially condense propene (boiling point: −47.6° C.) from a gaseous mixture of propene and propane (boiling point: −42° C.).

If the first and second hydrocarbons have dissimilar boiling points, the mixture of the first and second hydrocarbons may comprise between 85% by volume and 15% by volume of the first hydrocarbon, and between 85% by volume and 15% by volume of the second hydrocarbon; between 35% by volume and 65% by volume of the first hydrocarbon, and between 35% by volume and 65% by volume of the second hydrocarbon; or even about 50% by volume of the first hydrocarbon, and about 50% by volume of the second hydrocarbon, where the first hydrocarbon has the lower boiling point. Dissimilar boiling points are here defined to mean that $T_2 \geq T_1 + 15$ K, that $T_2 \geq T_1 + 25$ K, or that $T_2 \geq T_1 + 50$ K. In various embodiments, gases with dissimilar boiling points may be selected so that $T_2 \geq T_1 + 15$ K and $T_2 \leq T_1 + 50$ K. If desired, gases with dissimilar boiling points may be selected so that $T_2 \geq T_1 + 35$ K and $T_2 \leq T_1 + 100$ K. Examples of gases with dissimilar boiling points include ethane and propane, ethane and butane, or propane and butane. If the gases have dissimilar boiling points, the condensate from the de Laval nozzle may be enriched in the gas with the higher boiling point, i.e., the second hydrocarbon.

In various embodiments, it may be desirable to recover hydrocarbon gases from a gas stream containing hydrogen or another non-condensable gas. In some embodiments, a waste gas stream comprising a condensable hydrocarbon, e.g., C3 and/or C4 hydrocarbons, and a non-condensable gas, e.g., hydrogen or methane, may be passed into an apparatus for separating condensable and non-condensable gases. A condensable output gas containing a condensable hydrocarbons and a reduced content of non-condensable gases is recovered, and passed to an inlet of a de Laval nozzle at an initial temperature of between 0° C. and 100° C. and an initial pressure of between 200 psig and 500 psig. The condensable hydrocarbon gas may be condensed and recovered by techniques described herein. The apparatus for separating condensable and non-condensable gases may be a membrane which is selectively permeable to a non-condensable gas of interest, e.g., hydrogen or nitrogen.

BRIEF DESCRIPTION OF THE DRAWINGS

In order to better understand various exemplary embodiments, reference is made to the accompanying drawings, wherein.

DETAILED DESCRIPTION

Figure 1:
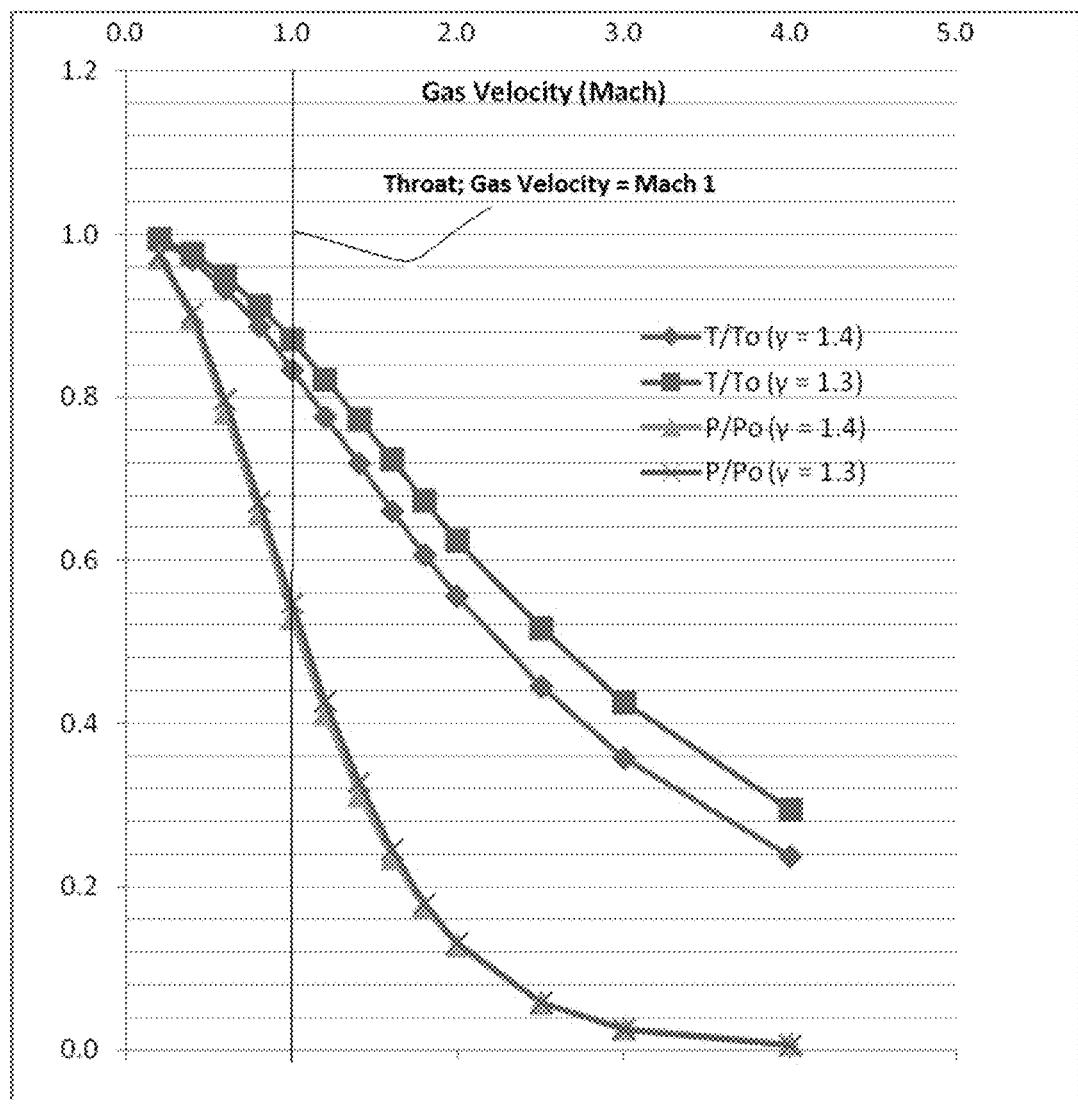
FIG. 1 shows the change in gas temperature and in gas pressure as the gas accelerates through a de Laval nozzle.

Use of De Laval Nozzles in Gas Separation

Supersonic separation methods operate by accelerating a gas mixture to supersonic speeds by passing the mixture through a converging-diverging nozzle. The expansion process lowers the temperature and pressure of the gas mixture. If the partial pressure of a condensable component in the vapor is decreased below the vapor pressure of that component at the local temperature, homogeneous nucleation can commence, initiating the formation of small droplets of the condensate that may then grow via condensation and coagulation mechanisms. These droplets are typically very small (of the order of 0.1 microns) and generally travel with the speed of the gas. To collect these droplets, supersonic separators utilize swirl vanes and other devices to induce centripetal acceleration of the droplets toward the nozzle walls, where they may be captured. The swirling devices also increase local turbulence levels within the separator, greatly increasing the probability of droplet-droplet collisions which lead to larger droplet volumes and enhanced potential for collection.

The current disclosure is directed toward practical utilities of a de Laval nozzle, or convergent-divergent nozzle, in gas separation. In various embodiments disclosed herein, a stream of gases or a mixture of gas and vapor passes through a de Laval nozzle. The nozzle has an axisymmetric hourglass shape, pinched in the middle. As gas passes through the pinched portion of the nozzle (the throat), its velocity increases. At the throat of the de Laval nozzle, gas velocity c is equal to the square root of γRT (signified as $\sqrt{\gamma RT}$), where γ is a constant for a particular gas or gas mixture. The parameter γ may change if the composition of the gas changes as it passes the de Laval nozzle. For this model it is assumed that γ is a constant dependent on the nature of the gas. For hydrocarbon mixtures, γ is ~1.3, while for air, γ is ~1.4. In the following discussion, temperature will be reported in degrees K, and pressure in bar, defined as equal to 0.1 Mpa or 0.987 atm.

At the throat of the de Laval nozzle, the gas velocity reaches sonic velocity, i.e., the velocity c=Mach 1. At Mach 1, $(c/\sqrt{\gamma RT})=1$. Prior to entering the throat, gas velocity c is subsonic, i.e., $(c/\sqrt{\gamma RT})<1$; while after exiting the throat, gas velocity c is supersonic, i.e., $(c/\sqrt{\gamma RT})>1$. It has been demonstrated that temperature of a gas in a de Laval nozzle is dependent on $\gamma$ and on gas velocity, measured in terms of Mach number M, where $M=(c/\sqrt{\gamma RT})$. Temperature of a gas in a de Laval nozzle, reported in terms of the ratio between the temperature of gas within the nozzle, T, and the initial gas temperature prior to entering the nozzle $T_o$, is given by Equation (1):

$$T/T_o = 1/(1+KM^2) \quad (1)$$

where:

$K=(\gamma-1)/2$

Similarly, pressure of a gas in a de Laval nozzle, reported in terms of the ratio between the pressure of gas within the nozzle, P, and the initial gas temperature prior to entering the nozzle $P_0$, is given by Equation (2):

$$P/P_o = [1/(1+KM^2)]^X \quad (2)$$

where:

$K=(\gamma-1)/2$ and $X=\gamma/(\gamma-1)$

For hydrocarbon mixtures, where $\gamma$ is ~1.3, K=0.15 and X=4.33; for air, where $\gamma$ is ~1.4, K=0.2 and X=3.5.

As the gas leaves the nozzle at supersonic speed, both pressure and temperature fall. The change in pressure and temperature as a function of gas velocity (reported as a Mach value) is presented in Table 1 below for both air and hydrocarbon gases, at velocities of up to Mach 4; data for $T/T_o$ and $P/P_o$ is shown as a function of Mach number M in FIG. 1.

FIG. 1 shows that air temperature decreases more rapidly than hydrocarbon gas temperature as it accelerates through the de Laval nozzle. However, the change in air pressure and in hydrocarbon gas pressure in a de Laval nozzle is, for all practical purposes, identical.

TABLE 1

Pressure and temperature as a function of gas velocity in a de Laval nozzle.

| Velocity (Mach) | $T/T_o$ ($\gamma$ = 1.4) | $T/T_o$ ($\gamma$ = 1.3) | $P/P_o$ ($\gamma$ = 1.4) | $P/P_o$ ($\gamma$ = 1.3) | T (Air, °K)[1] | T (HC, °K)[2] |
|---|---|---|---|---|---|---|
| 0.2 | 0.992 | 0.994 | 0.972 | 0.974 | 310.5 | 311.1 |
| 0.4 | 0.969 | 0.977 | 0.896 | 0.904 | 303.3 | 305.8 |
| 0.6 | 0.932 | 0.949 | 0.782 | 0.797 | 291.7 | 297.0 |
| 0.8 | 0.887 | 0.912 | 0.657 | 0.671 | 277.6 | 285.5 |
| 1.0 | 0.833 | 0.870 | 0.528 | 0.547 | 260.7 | 272.3 |
| 1.2 | 0.776 | 0.822 | 0.412 | 0.428 | 242.9 | 257.3 |
| 1.4 | 0.718 | 0.773 | 0.313 | 0.328 | 224.7 | 241.9 |
| 1.6 | 0.661 | 0.723 | 0.235 | 0.246 | 206.9 | 226.3 |
| 1.8 | 0.607 | 0.673 | 0.174 | 0.180 | 190.0 | 210.6 |
| 2.0 | 0.556 | 0.625 | 0.128 | 0.131 | 174.0 | 195.6 |
| 2.5 | 0.444 | 0.516 | 0.058 | 0.057 | 139.0 | 161.5 |
| 3.0 | 0.357 | 0.425 | 0.027 | 0.025 | 111.7 | 133.0 |
| 4.0 | 0.238 | 0.294 | 0.007 | 0.005 | 74.5 | 92.0 |

[1]Initial temperature $T_o$ = 313° K.
[2]HC = hydrocarbons; initial temperature $T_o$ = 313° K.

During passage of a gas mixture through a de Laval nozzle, gases derived from higher boiling materials may condense as a liquid, while low-boiling gases are recovered as gases. This is due to the change in equilibrium vapor pressure as the temperature drops after the gas exits the nozzle; if temperature drops to a point $T_1$ where the vapor pressure of the gas is greater than the equilibrium vapor pressure of that gas at temperature $T_1$, the gas will begin to condense so as to achieve an equilibrium between the liquid and vapor phases. Since pressure and temperature are changing rapidly in the accelerating gas stream; due to the rapidly changing conditions, a liquid/vapor equilibrium cannot be achieved in the accelerating gas stream. As the pressure decreases, further nucleation occurs.

During condensation, fine liquid droplets nucleate and grow. The stream of gases is subjected to a vortex chamber or similar device, which causes vapors to swirl around a central axis as they leave the nozzle; centrifugal forces aid in separation of condensed droplets of liquefied gas from the gas or vapor stream.

Methane, at a starting pressure of 21 bar and a starting temperature of 313° K, achieves:

a pressure of 0.53 bar and a temperature of 133° K at Mach 3; and a pressure of 0.11 bar and a temperature of 92° K at Mach 4.

At 133° K, the equilibrium vapor pressure for methane is about 5 bar. Similarly, at 92° K, the equilibrium vapor pressure for methane is about 0.45 bar. Since the equilibrium vapor pressure for methane, at supersonic gas velocities of up to Mach 4, exceeds the actual pressure achieved in a supersonic gas stream, methane does not undergo condensation in supersonic gas streams. Thus, methane, in this model, is considered to be a non-condensable gas.

Recovery and Recycling of Hydrocarbon Gases

The current disclosure is directed to recovery and reuse or recycling of condensable hydrocarbons from a mixture of methane or other non-condensable gases and condensable hydrocarbons. Additionally, the current disclosure is directed to fractionation of mixtures of condensable gases, such as water vapor and/or C2 to C4 hydrocarbons, using de Laval nozzles. The current disclosure is further directed to recovery and/or recycling of purified condensable gases from mixtures of gases using de Laval nozzles.

Various embodiments of the disclosed process are used for gas separation. In particular, the process is directed towards condensing C3 hydrocarbons and other heavy components from a gas stream comprising C3 hydrocarbons, methane, oxygenated compounds (propanols, butyraldehydes, etc.), and various inorganic gases using a Laval nozzle.

In embodiments directed to gas separation, a stream of gases or a mixture of gas and vapor passes through a de Laval nozzle, and accelerates to supersonic speed (c>Mach 1). As the gas leaves the nozzle at supersonic speed, both pressure and temperature fall. Gases derived from higher boiling materials condense as a liquid, and low-boiling gases are recovered as gases. The stream of gases is subjected to a vortex chamber or similar device, which causes vapors to swirl around a central axis as they leave the nozzle; centrifugal forces aid in separation of condensed gases from the gas or vapor stream.

Various embodiments relate to treatment of a gas stream from a hydroformylation reaction process, where propene (propylene) gas reacts with hydrogen and carbon monoxide to produce butyraldehydes. These gas streams may comprise the following streams, where the Oxo Purge Stream comes from hydroformylation with a conventional rhodium-containing hydroformylation catalyst, such as tris(triphenylphosphine)rhodium carbonyl hydride, with the formula $RhH(PPh_3)_3CO$. Under certain conditions, the purge stream from a hydroformylation reactor may be carried out relatively low pressure for the preparation of high proportions of n-butyraldehyde from propene, using techniques described in, for example, U.S. Pat. Nos. 4,694,109; 4,742,178; and 5,026,886, incorporated herein by reference.

As can be seen from the chart below, the low pressure hydroformylation purge stream in this model can potentially contain a high concentration of propene. A method of effectively recovering this unreacted starting material would be desirable.

| Compound | Amount (Oxo Purge; mole %) | Amount (Low Pressure Oxo Purge; weight %) |
|---|---|---|
| Hydrogen | 44 | 8 |
| Nitrogen | 15 | 3.3 |
| Argon | — | 1 |
| Carbon monoxide | 12.6 | 3 |
| Carbon dioxide | 2.7 | — |
| Methane | 2.8 | 2.9 |
| Ethane | 0.5 | — |
| Propene | 21 | 58 |
| Propane | 1.4 | 20 |
| Butyraldehydes | — | 3.8 |

In various embodiments, the Oxo Purge gas stream, the low pressure Oxo Purge gas stream, or a mixture thereof is taken from a hydrocarboxylation reaction process and passed through a de Laval nozzle. As the gas stream exits the de Laval nozzle with a swirling flow pattern, propene (boiling point: −47.6° C.), propane (boiling point: −42.2° C.), and butyraldehydes condense as a liquid and are recovered as a liquid sidestream from a pipe exiting the de Laval nozzle. The other gases are not condensed, and leave the pipe exiting the de Laval nozzle as a gas. The gas stream may enter the de Laval nozzle at a temperature of about 0° C. to 100° C., 0° C. to 60° C., 20° C. to 40° C., or 40° C.; and a pressure of about 200 to 500 psig, about 250 to 450 psig, or about 305 psig.

Apparatus for Recovery of Gases Using De Laval Nozzles

Figure 2:
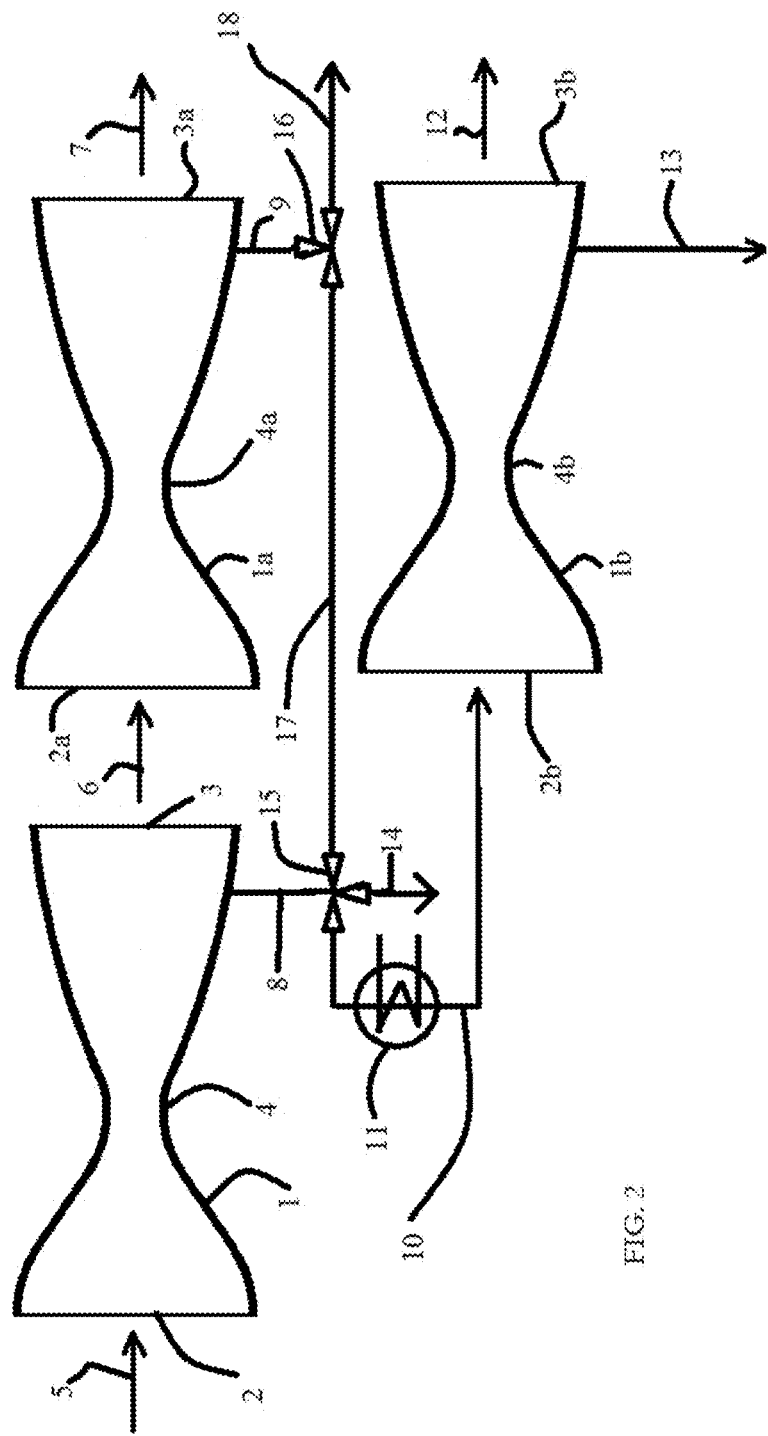
FIG. 2 shows an apparatus comprising multiple de Laval nozzles for use in a process of the present disclosure.

FIG. 2 illustrates an apparatus comprising a first de Laval nozzle 1, a second de Laval nozzle 1b, and a third de Laval nozzle 1a, designed to separate hydrocarbon gases in a gas stream comprising a high boiling gas and a low boiling gas. Nozzle 1 has an entrance 2, a converging portion, a diverging portion leading to an exit 3, and a throat between the converging and diverging portions. A gas stream comprising a first gas and a second gas enters the entrance 2 of nozzle 1 in the direction of arrow 5. When the gas stream reaches throat 4, the velocity of the gas stream in the nozzle is Mach 1. As the gas stream travels from the throat to the nozzle exit 3, the velocity of the gas stream increases to supersonic velocities while the pressure and temperature of the gas stream decreases. If the gas temperature drops to a point where the partial pressure of the high boiling gas in the gas stream exceeds the equilibrium vapor pressure of at least one gas in the gas stream, the that gas will condense from the gas stream as a liquid. The condensed liquid is recovered from the de Laval nozzle through conduit 8. Noncondensed gases leave nozzle 1 through exit 3 in the direction of arrow 6.

The condensed liquid in conduit 8 comprises at least a portion of the high boiling gas in the gas stream. If the high boiling gas and the low boiling gas have dissimilar boiling points, the condensed liquid may comprise substantially pure high boiling gas. If the high boiling gas and the low boiling gas have similar boiling points, e.g., within about 10° C. of each other, the condensed liquid may comprise a mixture of high boiling gas and low boiling gas; however, the condensed liquid may be enriched in one of these gases, relative to the initial gas stream entering nozzle 1. For example, if the initial gas stream comprises 65% propene (boiling point: −47.6° C.) and 35% propane (boiling point: −42° C.), propene may be preferentially condensed from the mixture. Despite the fact that propene has a lower boiling point, it condenses from the mixture because, under these conditions, it has a greater vapor pressure in the supersonic gas stream in the de Laval nozzle.

If the condensed liquid in conduit 8 comprises substantially pure high boiling gas, the condensed liquid is carried to valve 15, where it is drawn off in the direction of arrow 14 for collection.

If the condensed liquid in conduit 8 comprises a mixture which is enriched in one of the high and low boiling gases, the condensed liquid mixture is carried to valve 15, and then travels in the direction of conduit 10 toward a second de Laval nozzle 1b. As the condensed liquid travels through conduit 10, it is vaporized by heat exchanger 11. The vaporized gas obtained using heat exchanger 11 may also be pressurized.

The vaporized gas in conduit 10 enters the entrance 2b of the second de Laval nozzle 1b. After the vaporized gas passes throat 4b of nozzle 1b, the velocity of the gas stream increases to supersonic velocities while the pressure and temperature of the gas stream decreases. If the gas temperature drops to a point where the partial pressure of the high boiling gas in the gas stream exceeds the equilibrium vapor pressure of the high boiling gas, further condensation from the vaporized gas stream occurs. Additional condensed liquid is recovered from nozzle 1b through conduit 14. Noncondensed gases from the vaporized gas stream leave nozzle 1b through exit 3b in the direction of arrow 12.

The condensed liquid in conduit 13 is further enriched in one of the high and low boiling gases, relative to the vaporized gas in conduit 10. For example, if the initial gas stream in conduit 5 comprises 65% propene and 35% propane (boiling point: −42° C.), propene is preferentially condensed from the mixture in nozzle 1. The condensate from nozzle 1 may then comprise 75% to 95% propene, or 80% to 90% propene, for example. The condensate from nozzle 1 is then vaporized and treated by supersonic acceleration in nozzle 1b. The condensate from nozzle 1b is further enriched in propene, and may comprise 90% propene to 99% propene.

Noncondensed gases from nozzle 1 may travel through conduit 6 in the direction of the third de Laval nozzle 1a. Nozzle 1a has an entrance 2a, an exit 3a, and a throat 4a. The gas stream in conduit 6 comprises the first gas and the second gas, and enters entrance 2a of nozzle 1a. When the gas stream reaches throat 4a, the velocity of the gas stream in the nozzle 1a is Mach 1. As the gas stream from conduit 6 travels from the throat 4a to the nozzle exit 3a, the pressure and temperature of the gas stream decreases. Further condensation occurs in nozzle 1a, producing an additional portion of condensed liquid. The condensed liquid is recovered from the de Laval nozzle 1a through conduit 9. Noncondensed gases leave nozzle 1a through exit 3a in the direction of arrow 7.

The condensed liquid recovered from the de Laval nozzle 1a travels through conduit 9 until it reaches valve 16. If the first and second gases in the mixture entering nozzle 1 through conduit 5 have dissimilar boiling points, the condensed liquid in conduit 9 may comprise substantially pure high boiling gas. If the condensed liquid in conduit 9 is substantially pure high boiling gas the condensed liquid is carried to valve 15, where it is drawn off in the direction of arrow 18 for collection. If desired, the condensate from nozzle 1 may be collected through conduit 17, and carried to valve 16. The condensates from nozzles 1 and 1a may then be combined at valve 16 and drawn off in the direction of arrow 18 for collection.

If the first and second gases in the mixture entering nozzle 1 through conduit 5 have similar boiling points, the condensed liquid in conduit 9 may comprise a mixture of high and low boiling gases. If the condensed liquid in conduit 9 is such a mixture, the condensed liquid is carried to valve 16, and then carried from valve 16 to valve 15 through conduit 17. At valve 15, the condensates from nozzles 1 and 1a may be combined at nozzle 16 and sent to the second de Laval nozzle 1b through conduit 10. At nozzle 1b, vapors derived from the condensates from nozzles 1 and 1a are subjected to supersonic acceleration to produce a more highly enriched condensate.

In various embodiments, two hydrocarbon gases may be separated using an apparatus comprising a de Laval nozzle, and a separate apparatus, such as a distillation column, for fractionating a hydrocarbon feed.

Figure 3A:
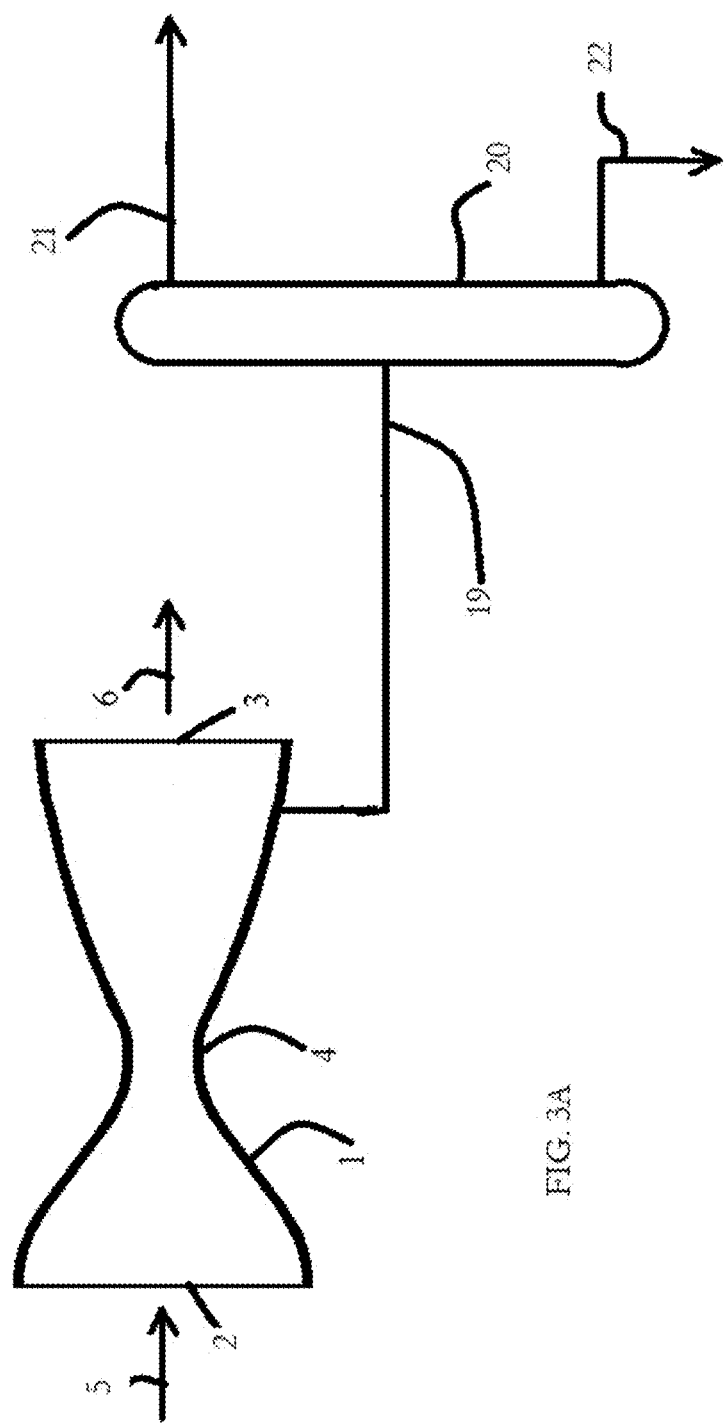
FIGS. 3A and 3B each show an apparatus comprising a distillation column in combination with a de Laval nozzle for use in a process of the present disclosure.

FIG. 3A illustrates an apparatus comprising a de Laval nozzle 1 and a distillation column 20, designed to separate hydrocarbon gases in a gas stream comprising a high boiling gas and a low boiling gas. Nozzle 1 has an entrance 2, a converging portion, a diverging portion leading to an exit 3, and a throat 4 between the converging and diverging portions. A gas stream comprising a first gas and a second gas enters the entrance 2 of nozzle 1 in the direction of arrow 5. As the gas stream travels from the throat to the nozzle exit 3, the velocity of the gas stream increases to supersonic velocities while the pressure and temperature of the gas stream decreases. Under the proper conditions, one of the first and second gases will preferentially condense from the gas stream as a liquid, and be carried off through conduit 19. Noncondensed gases exit the nozzle in the direction of arrow 6. The condensed liquid in conduit 19 is then fed to column 20. The condensed liquid is enriched in one of the first and second gases, relative to the mixture entering the de Laval nozzle.

The condensed liquid is distilled in column 20, producing a vapor stream 21 enriched in the lower boiling gas of the first and second gases and a liquid bottoms stream 22 enriched in the higher boiling of the first and second gases. Thus, a butane stream may be recovered from a butane/propane mixture by condensing a liquid enriched in butane from the mixture in nozzle 1, and distilling the condensed butane stream to recover liquid butane as bottoms stream 22 and recover residual propane from the condensed stream as vapor stream 21.

Also, a propene stream may be recovered from a 65% propene/35% propane mixture using the apparatus of FIG. 3A. The 65% propene/35% propane mixture is treated in a de Laval nozzle, under conditions in which propene preferentially condenses from the mixture. The condensed propene stream is then distilled to recover propene as vapor stream 21 and recover residual propane from the condensed stream as bottoms stream 22.

Figure 3B:
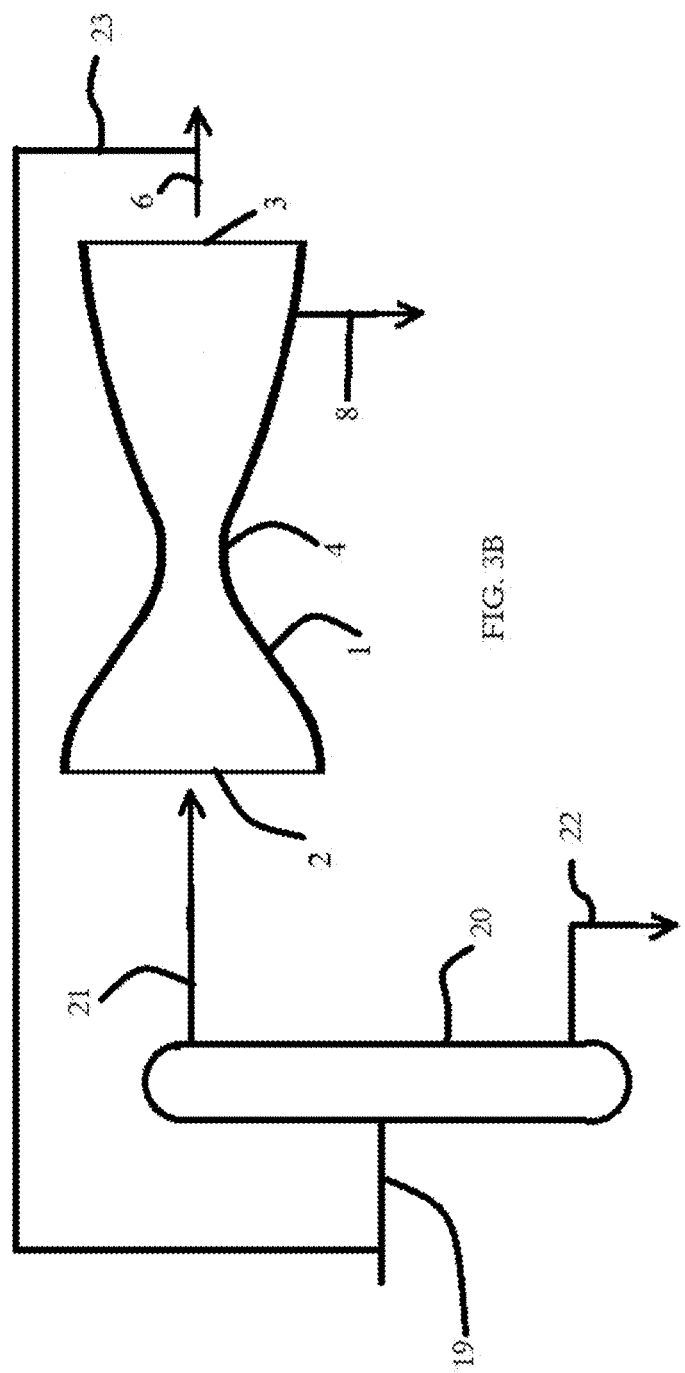

If desired, fractionation in a distillation column may be performed prior to supersonic treatment in a de Laval nozzle, as shown in FIG. 3B. A feed stream 19 comprising a low boiling first gas and a low boiling second gas is fed to column 20, where the feed stream is distilled to produce an overhead vapor stream 21 and a liquid bottoms stream 22. Vapor stream 21 is enriched in the first gas, and is fed to the inlet 2 of de Laval nozzle 1. Assuming that the first and second gases have similar boiling points, a condensate further enriched in the low boiling first gas may be condensed from vapor stream 21 in nozzle 1, and recovered through conduit 2. Noncondensed gases are recovered from nozzle 1 through conduit 6, and may be recycled to feed 19 through conduit 23 for recovery of additional low boiling gas, if desired.

Using the apparatus of FIG. 3B, an enriched propene stream may be recovered from a 65% propene/35% propane mixture. The 65% propene/35% propane mixture is distilled in the column 20 to produce a vapor stream 21 comprising from 70% to 98% propene, from 75% to 95% propene, or from 80% to 90% propene. The vapor stream 21 may then be treated in de Laval nozzle 1 to produce a condensate in conduit 8, comprising >90% propene, >95% propene, or >98% propene. Although FIGS. 3A and 3B show fractionation with distillation columns, hydrocarbon gases may be separated using de Laval nozzles in combination with other methods of gas separation. Alkanes and alkenes of similar molecular weight, e.g., propane/propene or butane/butenes, may be partially separated with selectively permeable cellulosic or polyimide membranes either before or after a step of separation using supersonic acceleration in a de Laval nozzle. Similarly, alkanes and alkenes of similar molecular weight may be partially separated by selective adsorption on a molecular sieve, either before or after a step of separation using supersonic acceleration in a de Laval nozzle.

Drying and Recovery of Hydrocarbon Gases

Various embodiments disclosed herein are directed to a method of drying volatile hydrocarbon gases in a vapor stream. Various embodiments are directed to drying of wet ethene gas, wet propene gas, or a wet mixture of C1 to C4 alkanes, where the supply pressure is between 7 and 1400 psig, the supply temperature is between 5° C. and 50° C.; and the relative humidity is between 5% and 95%.

In some embodiments, the vapor stream may contain, based on the weight of the hydrocarbon gases:
from 50% to 100% C3 hydrocarbons, from 70 to 100% C3 hydrocarbons, from 85 to 100% C3 hydrocarbons, or from 85% to 98% C3 hydrocarbons;
from 0% to 10% methane, from 0.5% to 5% methane; or from 1% to 3% methane; and from 100 ppm to 100,000 ppm water, from 500 ppm to 10,000 ppm water; or from 1000 ppm to 5,000 ppm water;
with the balance being C2 and C4 hydrocarbons.

In some embodiments, the vapor stream may contain, based on the weight of the hydrocarbon gases:
from 50% to 100% C4 hydrocarbons, from 70 to 100% C4 hydrocarbons, from 85 to 100% C4 hydrocarbons, or from 85% to 98% C4 hydrocarbons;
from 1% to 10% methane, from 0.5% to 5% methane; or from 1% to 3% methane; and
from 100 ppm to 100,000 ppm water, from 500 ppm to 10,000 ppm water; or from 1000 ppm to 5,000 ppm water; with the balance being C2 and C3 hydrocarbons.

In some embodiments, the vapor stream may contain greater than 50%, greater than 70%, or greater than 85% C2 hydrocarbons; up to 100,000 ppm water, up to 10,000 ppm water; or from up to 5,000 ppm water; and less than 10%, less than 5%, or less than 3% methane, with the balance being C3 and C4 hydrocarbons.

Various embodiments disclosed herein relate to a method of drying a vapor stream comprising C1 to C4 hydrocarbon gases, by passing a vapor stream comprising such hydrocarbon gases into an inlet of a de Laval nozzle having a throat, said vapor stream having an initial temperature of between 0° C. and 100° C.; between 10° C. and 60° C.; an initial temperature of between 5° C. and 50° C.; or an initial temperature of between 20° C. and 40° C.; and an initial pressure of between 150 psig and 1000 psig, between 300 psig and 800 psig; between 200 psig and 500 psig, or between 500 psig and 1000 psig;

expanding the vapor stream after the vapor stream passes through the throat of the de Laval nozzle, producing a reduced-temperature vapor stream;

condensing water from the reduced-temperature vapor stream to produce a dried stream; and recovering the condensed $H_2O$ from said vapor stream;

wherein the dried stream comprises C1 to C4 hydrocarbon gases and from 0 ppm to 10 ppm water. In various embodiments, the C1 to C4 hydrocarbon gases are selected from the group consisting of C2 hydrocarbons, C3 hydrocarbons, C4 hydrocarbons, and mixtures thereof. The C1 to C4 hydrocarbon gases may be C3 gases selected from the group consisting of propane, propene, propyne, and mixtures thereof. The C1 to C4 hydrocarbon gases may be C2 gases selected from the group consisting of ethane, ethene, acetylene, and mixtures thereof. The C1 to C4 hydrocarbon gases may comprise from 80 to 100% by mass of a mixture of C2 and C3 gases, in a C2 to C3 ratio of between 1:9 and 9:1, between 1:4 and 4:1, between 2:3 and 3:2, or 1:1. The C1 to C4 hydrocarbon gases may comprise from 80 to 100% by mass of C3 gases; or from 80 to 100% by mass of C2 gases.

Various embodiments disclosed herein are directed to a method of drying volatile hydrocarbon gases in a vapor stream; and recovering dried gases from the vapor stream. In some embodiments, the initial vapor stream may contain, based on the weight of the hydrocarbon gases:
from 50% to 100% C3 hydrocarbons, from 70 to 100% C3 hydrocarbons, from 85 to 100% C3 hydrocarbons, or from 85% to 98% C3 hydrocarbons;
from 1% to 10% methane, from 0.5% to 5% methane; or from 1% to 3% methane; and
from 100 ppm to 100,000 ppm water, from 500 ppm to 10,000 ppm water; or from 1000 ppm to 5,000 ppm water; with the balance being C2 and C4 hydrocarbons.

In some embodiments, the vapor stream may contain, based on the weight of the hydrocarbon gases:
from 50% to 100% C4 hydrocarbons, from 70 to 100% C4 hydrocarbons, from 85 to 100% C4 hydrocarbons, or from 85% to 98% C4 hydrocarbons;
from 1% to 10% methane, from 0.5% to 5% methane; or from 1% to 3% methane; and
from 100 ppm to 100,000 ppm water, from 500 ppm to 10,000 ppm water; or from 1000 ppm to 5,000 ppm water; with the balance being C2 and C3 hydrocarbons.

In some embodiments, the vapor stream may contain greater than 50%, greater than 70%, or greater than 85% C2 hydrocarbons; up to 100,000 ppm water, up to 10,000 ppm water; or from up to 5,000 ppm water; and less than 10%, less than 5%, or less than 3% methane, with the balance being C3 and C4 hydrocarbons.

Various embodiments disclosed herein relate to a method of recovering dried hydrocarbon gases in a vapor stream comprising C1 to C4 hydrocarbon gases, by first drying the vapor stream, and then condensing the desired hydrocarbon gases from the vapor stream.

According to various embodiments disclosed herein, the drying step involves passing a vapor stream comprising C1 to C4 hydrocarbon gases and up to 100,000 ppm water into an inlet of a de Laval nozzle having a throat, where the vapor stream having an initial temperature of between 0° C. and 100° C.; between 10° C. and 60° C.; or an initial temperature of between 20° C. and 40° C.; and an initial pressure of between 150 psig and 1000 psig;

expanding the vapor stream after the vapor stream passes through the throat of the de Laval nozzle, producing a reduced-temperature vapor stream;

condensing water from the reduced-temperature vapor stream to produce a dried stream; and recovering the condensed $H_2O$ from said vapor stream to produce a dried stream;

where the dried stream comprises C1 to C4 hydrocarbon gases and from 0 ppm to 10 ppm water.

In various embodiments, the method further comprises a step of inducing swirling flow in the vapor stream prior to expanding, or after expanding but before recovering; so that the swirling flow drives the condensed water toward the wall of the de Laval nozzle or the wall of a pipe connected to an exit of the de Laval nozzle by centrifugal force.

In a second step, the dried stream is passed into an inlet of a de Laval nozzle having a throat, at an initial temperature of between 0° C. and 100° C. and an initial pressure of between 200 psig and 500 psig. The dried stream is expanded after the vapor stream passes through the throat of the de Laval nozzle, producing a second reduced-temperature stream; and C1 to C4 hydrocarbons then condense from the second reduced-temperature stream as liquid droplets; and are recovered as condensed droplets of dried C1 to C4 hydrocarbons from the reduced-temperature stream.

The droplets of dried C1 to C4 hydrocarbons may be fed directly to a chemical reactor as a reactant feed. In some embodiments, the initial vapor stream is a waste gas stream from a chemical reactor, and the droplets of dried C1 to C4 hydrocarbons are recycled to a chemical reactor, where the chemical reactor may be a hydroformylation reactor or a gas phase polymerization reactor.

Fractionation of C2 to C4 Hydrocarbon Gases

According to various embodiments disclosed herein, hydrocarbons in a gas stream comprising a first hydrocarbon having 2 or 3 carbon atoms, and a second hydrocarbon having 3 or 4 carbon atoms may be fractionated. In some embodiments, the first and second hydrocarbons do not both have 3 carbon atoms. In other embodiments, the first and second hydrocarbons may both have 3 carbon atoms and similar boiling points. According to this method, the gas stream is passed into an inlet of a de Laval nozzle having a throat, where the gas stream has an initial temperature of between 0° C. and 100° C. and an initial pressure of a critical pressure of the gas stream, between 200 psig and 500 psig, or between 250 psig and 350 psig. The gas stream expands after passing through the throat of the de Laval nozzle, producing a reduced-temperature stream. A fraction enriched in the second hydrocarbon condenses from the reduced-temperature stream as liquid droplets; and is recovered as a liquid. A gaseous fraction enriched in the first hydrocarbon exits the outlet of the de Laval nozzle, and may be recovered.

The gas stream to be fractionated may, for example, comprise ethane and propane, propane or butane, or ethane and butane. The first hydrocarbon may be ethane, ethene, or a mixture thereof; or propane, propene, or a mixture thereof. The first hydrocarbon may be ethane, ethene, or a mixture thereof; or propane, propene, or a mixture thereof. The second hydrocarbon may be propane, propene, methylacetylene, propadiene, MAPD (a mixture of methylacetylene and propadiene), or a mixture thereof, or butane, 1-butene, 2-butene, isobutane, isobutylene, butadiene, or a mixture thereof.

Mixed Non-Condensable Gases and Condensable Hydrocarbon Gases

In some cases, a gas stream may contain a significant amount of a non-condensable gas in conjunction with a condensable gas. For purposes of this discussion, non-condensable gases include hydrogen (boiling point: −252.9°

C.); methane (boiling point: −161.5° C.); and nitrogen (boiling point: −195.8° C.). In such a case, the concentration of condensable gases in the mixture is reduced, and the amount of liquefied recovered from condensation in a de Laval nozzle may become unacceptably low. To increase recovery of condensed gases from a mixture of a condensable hydrocarbon gas and a non-condensable gas, the method may be modified to include a step of separating condensable and non-condensable gases.

An embodiment involving a step of separating condensable and non-condensable gases includes passing a waste gas stream comprising a condensable hydrocarbons, e.g., C3 and/or C4 hydrocarbons, and a non-condensable gas, e.g., hydrogen or methane, into an apparatus for separating condensable and non-condensable gases and separating the gases to recover a condensable output gas with a reduced content of non-condensable gases;
passing the condensable output gas into an inlet of a de Laval nozzle having a throat, said waste gas stream having an initial temperature of between 0° C. and 100° C. and an initial pressure of between 200 psig and 500 psig;
expanding the condensable output gas after it passes through the throat of the de Laval nozzle, producing a reduced-temperature stream;
condensing a first portion of condensable hydrocarbons from the reduced-temperature stream as a liquid, wherein about 12% by weight and about 40% by weight of the condensable hydrocarbons in the initial feed stream are condensed from the reduced-temperature stream as a liquid;
allowing non-condensed gases from the reduced-temperature stream to exit the de Laval nozzle; and
recovering the condensed first portion from said de Laval nozzle.

The first step of and separating condensable and non-condensable gases may be carried out in a number of ways, depending on the nature of the non-condensable gas. In some cases, the non-condensable gas is hydrogen. Hydrogen may be separated from condensable gases such as steam and condensable hydrocarbons, e.g., ethane, propane, and olefins, using a membrane. A suitable membrane comprises:
a nonporous hydrogen-permeable coating metal layer, e.g., palladium,
a rigid ceramic, carbon, or metal support matrix, e.g., steel, and
a porous intermediate layer, e.g., a woven fabric, between the coating metal layer and the support matrix. Additionally, Eltron Research and Development has described hydrogen separation membranes made of a dense metal alloy with catalyst layers. A hydrogen dissociation catalyst on the high pressure side of the membrane converts hydrogen gas into atomic hydrogen, which permeates through the membrane. A hydrogen desorption catalyst on the low pressure side of the membrane releases molecular hydrogen.

Similarly, propylene and the non-condensable gas nitrogen may be separated using a poly(ether blockamide)/polysulfone composite membrane.

Methane may be separated from a mixture of methane and C2 and/or C3 hydrocarbons in a demethanizer column. The gas stream is cooled and expanded to lower the pressure and temperature, and directed into a demethanizing column. The demethanizer column may be operated at a column pressure of approximately 410 psia, and a top temperature of −136° F. for recovery of ethane and/or propane in the bottom of the column, and −109° F. for recovery of propane. Also, polyether-based polyurethane-silica nanocomposite mixed matrix membranes (MMMs) containing 12.5% silica may be used for separation of C3 hydrocarbons from methane.

Accordingly, a mixture of two condensable gases and a non-condensable gas may be passed to a device for separation of the condensable and non-condensable gases, to produce a stream enriched in condensable gases. The separation device may be a gas separation membrane or a distillation column, as appropriate. The stream enriched in condensable gases is then passed to a de Laval nozzle for separation and/or recovery of the condensable gases, as previously discussed.

Thus, for example, a stream containing 43% hydrogen, with the balance being butane, propane and propene, may be sent to a separation apparatus with a hydrogen-permeable membrane to produce a hydrogen-rich stream and a stream rich in C3 and C4 condensable gases. The condensable gas stream is passed into an inlet of a de Laval nozzle having a throat, at an initial temperature of between 0° C. and 100° C. and an initial pressure of between 200 psig and 500 psig, and expanded after it passes through the throat of the de Laval nozzle. Expansion of the condensable gas stream produces a low-temperature stream, and the less volatile C4 hydrocarbon gas preferentially condenses from the low-temperature stream. The more volatile C3 hydrocarbon gases remaining in the gaseous phase, and exit the de Laval nozzle.

Removal of the hydrogen using a hydrogen-permeable membrane increases the concentration, and hence the pressure, of C4 hydrocarbon gases in the gas stream entering the de Laval nozzle. Since the driving force for condensation of volatile hydrocarbons in the de Laval nozzle is the difference between the equilibrium vapor pressure and the actual pressure of the condensable gas, increasing the volume percent of a condensable gas enhances the expected recovery of that gas in a condensed phase.

Since hydrogen-permeable membranes are frequently impermeable to steam or water vapor, a C3 vapor stream containing an unacceptable level of water and an unacceptable level of hydrogen may be purified in two stages. First, the hydrogen may be removed using a hydrogen-permeable membrane, as described above. The resulting moist C3 hydrocarbon stream may then be dried in a de Laval nozzle, producing a purified stream of dry C3 hydrocarbons.

Figure 4:
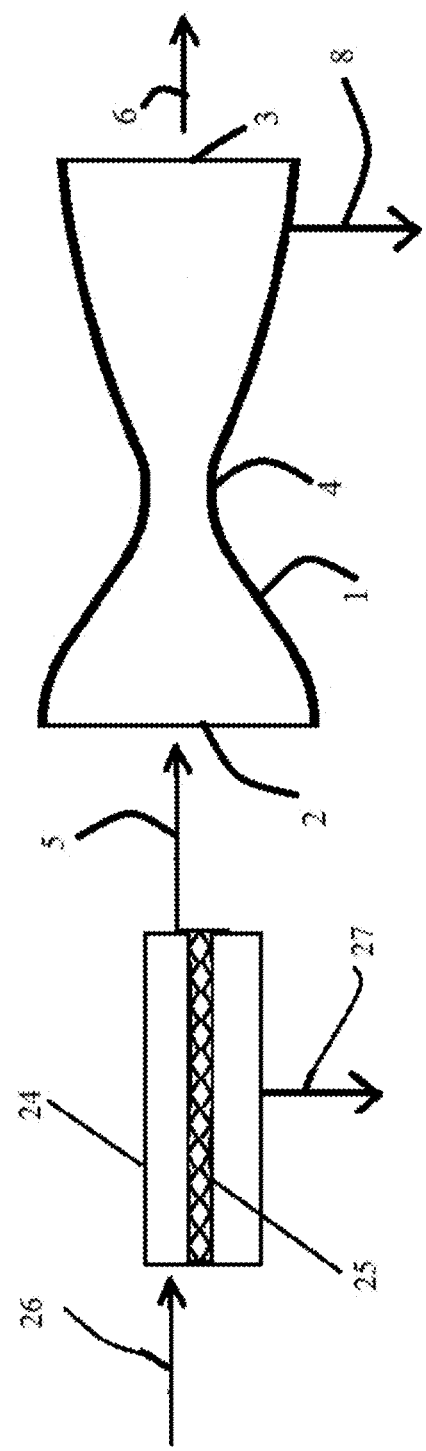
FIG. 4 shows an apparatus comprising a module for separation of condensable and non-condensable gases, in conjunction with a de Laval nozzle.

FIG. 4 shows an apparatus for removing a non-condensable gas from a hydrocarbon stream, prior to gas separation in a de Laval nozzle. The apparatus of FIG. 4 includes a de Laval nozzle 1, designed to separate hydrocarbon gases in a gas stream comprising a high boiling gas and a low boiling gas. Nozzle 1 has an entrance 2, a converging portion, a diverging portion leading to an exit 3, and a throat 4 between the converging and diverging portions. The apparatus also includes a module 24 for separating condensable and non-condensable gases. Module 24 includes a membrane 25 which is permeable to the non-condensable gas.

A gas stream 26 comprising a condensable gas and a non-condensable gas enters module 24. In some embodiments, the condensable gas is hydrogen, and the condensable gas is a mixture of C3-C4 hydrocarbons and, optionally, water vapor. The non-condensable hydrogen passes through membrane 25, and is recovered as stream 27. The condensable hydrocarbon gases and water do not penetrate membrane 25, and enters entrance 2 of nozzle 1 in the direction of arrow 5. Within the de Laval nozzle 1, higher-boiling gases condense as a liquid, and are recovered from the de Laval nozzle through conduit 8. Noncondensed gases leave nozzle 1 through exit 3 as stream 6. If gas stream 26 contains C3-C4 hydrocarbons and water vapor, water condenses in the de Laval nozzle and a dried hydrocarbon gas stream exits the de Laval nozzle as stream 6. If gas stream 26 contains a dry mixture of C3 and C4 hydrocarbons, C4 hydrocarbons condense in the de Laval nozzle and a C3 hydrocarbon gas stream exits the de Laval nozzle as stream 6.

Several practical applications of de Laval nozzles in gas separation are now described in the following examples.

EXAMPLE 1

Separation of Propane from a Propane/Air Mixture

Separation of propane from a gas stream of mixture of air and propane gas may be accomplished using a de Laval nozzle, where the gas-stream is at an initial pressure of 21 bar, and an initial temperature of 313° K. The gas mixture contains 20 mol % propane at partial pressure $P_1$ and 80 mol % air at partial pressure $P_2$; by the relationship $P=P_1+P_2$, the mixture under these initial conditions contains air at a partial pressure of 16.8 bar and propane at a partial pressure of 4.2 bar. Since the mixture is predominantly air, $\gamma$ is assumed to be ~4.4.

Figure 5A:
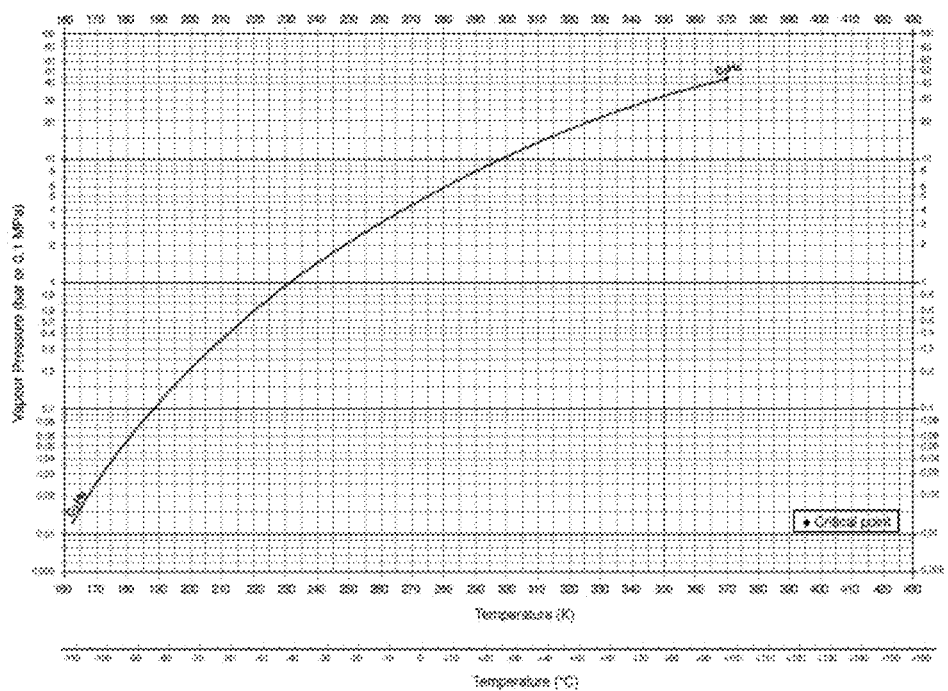
FIG. 5A shows the equilibrium vapor pressure of propane as a function of temperature.

FIG. 5A shows the equilibrium vapor pressure of propane (bar) as a function of temperature (degrees K). Table 2 shows the change in temperature and propane partial pressure as the gas accelerates from Mach 1, at the nozzle throat, to Mach 2.

TABLE 2

Propane Partial Pressure (Bar) in a de Laval Nozzle.

| Velocity (Mach) | T (Air, degrees K) | $P/P_o$ ($\gamma = 1.4$) | Propane Partial Pressure | Propane Equilibrium Vapor Pressure |
|---|---|---|---|---|
| 1.0 | 260.7 | 0.528 | 2.21 | 3 |
| 1.2 | 242.9 | 0.412 | 1.73 | 1.7 |
| 1.4 | 224.7 | 0.313 | 1.31 | 0.8 |
| 1.6 | 206.9 | 0.235 | 0.99 | 0.3 |
| 1.8 | 190.0 | 0.174 | 0.73 | 0.15 |
| 2.0 | 174.0 | 0.128 | 0.54 | 0.035 |

Figure 6:
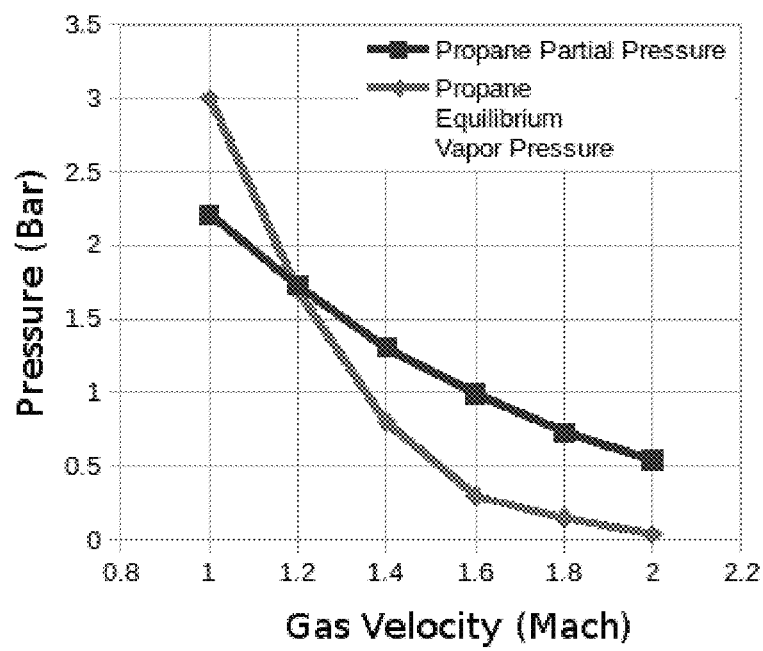
FIG. 6 compares the change in propane partial pressure in a de Laval nozzle to the equilibrium vapor pressure of propane.

Table 2, in columns 2 and 3 show the change in temperature and the ratio of pressure P to initial pressure $P_o$ as the gas accelerates from Mach 1, at the nozzle throat, to Mach 2 ($T_o$=313° K). Column 4 shows the propane partial pressure in gas mixture of 80% air and 20% propane gas as it travels through a de Laval nozzle, in the absence of condensation, based on an initial partial pressure of 4.2 bar. Column 5 shows the equilibrium vapor pressure of propane as a function of temperature. At the throat of the nozzle (Mach 1), the partial pressure of propane in the gas stream is less than the equilibrium vapor pressure of propane at the local temperature, i.e., in the throat). Similarly, at Mach 1.2, the partial pressure of propane in the gas stream is approximately equal to the equilibrium vapor pressure of propane. Between Mach 1.4 and Mach 2.0, the partial pressure of propane in the gas stream exceeds the equilibrium vapor pressure of propane, and condensation of excess propane vapor occurs, as shown in FIG. 6. Thus, prior to Mach 1.2, the propane partial pressure in the gas stream is given by Equation (2) as set forth above, and propane condensation does not occur.

After the gas stream reaches Mach 1.2, the propane partial pressure in the gas stream exceeds the equilibrium vapor pressure of propane, and propane condensation occurs. If the system was allowed to reach equilibrium at a velocity greater than Mach 1.2, propane would condense from the gas stream until the propane partial pressure in the gas stream was equal to the equilibrium vapor pressure. Thus, after Mach 1.2, the actual propane partial pressure in the gas stream is less than the pressure given by Equation (2), due to propane condensation from the gas stream. At the same time, since the gas stream is a non-equilibrium environment, the actual propane partial pressure in the gas stream is greater than the equilibrium vapor pressure of propane.

If the gas stream was allowed to reach equilibrium under conditions of temperature and pressure prevailing at Mach 2.0, approximately 93.5% of the propane gas would condense as a liquid. Condensation would reduce the propane partial pressure of 0.54 bar to the equilibrium vapor pressure of 0.035 bar. However, as a result of the rapidly changing temperature and pressure in the gas stream, equilibrium is not achieved and only a portion of this gas is recovered. In general, recovery of about 12% by weight to about 40% by weight of the propane in a gas stream by condensation in a de Laval nozzle is considered acceptable. Recovery can be increased by passing a gas stream through multiple de Laval nozzles in series, i.e., two de Laval nozzles in series, three de Laval nozzles in series, four de Laval nozzles in series, or more de Laval nozzles in series.

EXAMPLE 2

Separation of Propane from a Propane/Ethane Mixture

Use of a de Laval nozzle also allows separation of propane from a mixture of ethane gas and propane gas at an initial pressure of 21 bar, and an initial temperature of 313° K. The gas mixture contains 20 mol % propane at partial pressure $P_1$ and 80 mol % propane at partial pressure $P_2$; by the relationship $P=P_1+P_2$, the mixture under these initial conditions contains ethane at a partial pressure of 16.8 bar and propane at a partial pressure of 4.2 bar. The term $\gamma$ is assumed to be substantially constant at ~1.3, as the mixture is a mixture of hydrocarbon gases.

Figure 5B:
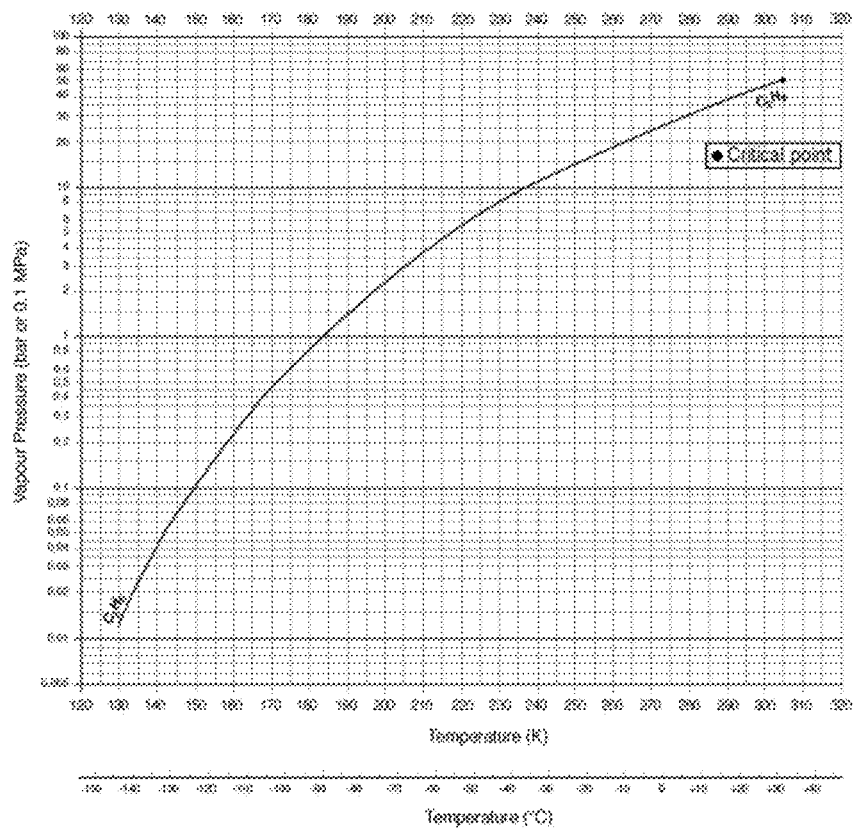
FIG. 5B shows the equilibrium vapor pressure of ethane as a function of temperature.
Figure 7:
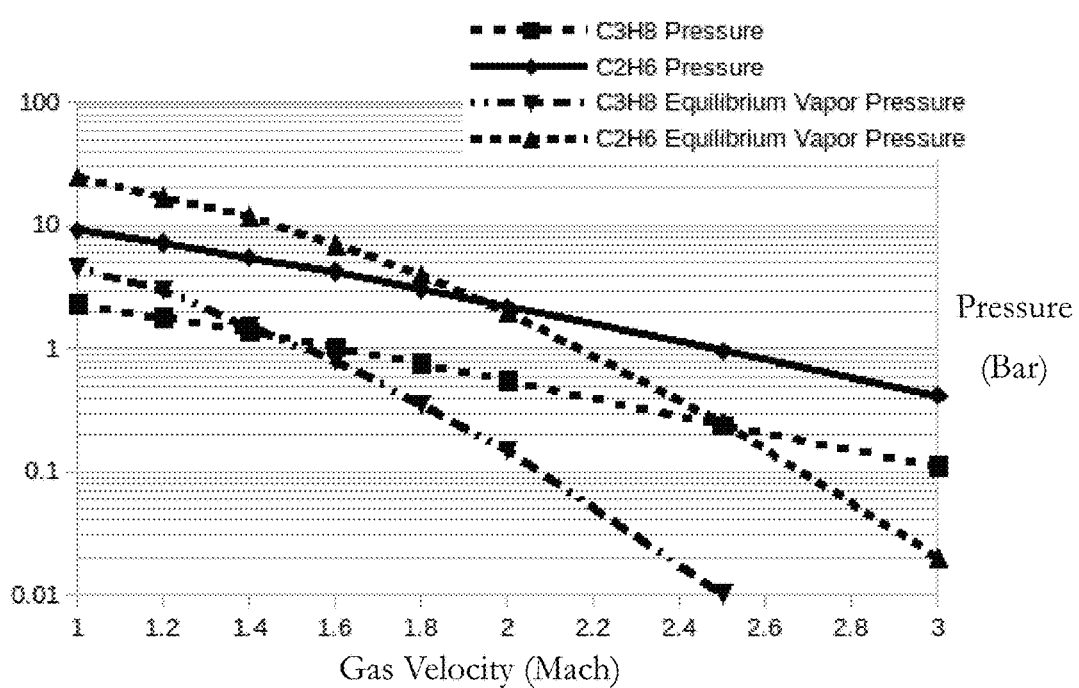
FIG. 7 shows separation of propane from an ethane/propane mixture in a de Laval nozzle, where propane begins condensation at Mach ~1.4 and ethane begins condensation at Mach ~2.

FIG. 5A and FIG. 5B show the equilibrium vapor pressures of propane and ethane (bar), respectively, as a function of temperature (degrees K). Table 3 presents the change in temperature and partial pressures as the gas accelerates from Mach 1, at the nozzle throat, to Mach 3. At the nozzle throat (Gas velocity c=Mach 1), the partial pressures of ethane and propane in the vapor stream are each less than the equilibrium vapor pressure. At Mach 1.6, the partial pressure of propane in the vapor stream exceeds the equilibrium vapor pressure of propane, and propane begins to condense from the vapor stream as liquid droplets. At Mach 1.6, the partial pressure of ethane in the vapor stream is less than the equilibrium vapor pressure of ethane, and ethane does not condense. Ethane does not condense until about Mach 2, as shown in the graph in FIG. 7. This allows substantially pure propane to be separated from an ethane/propane mixture, using a de Laval nozzle designed to accelerate gas to Mach 2. Even if a longer de Laval nozzle, designed to accelerate gas to Mach 2.5, is used, an ethane/propane mixture can be fractionated into:

1) a propane-rich fraction recovered as a liquid; and 2) an ethane-rich gaseous fraction recovered at the outlet of the de Laval nozzle

TABLE 3

Propane Partial Pressure (Bar) in a Propane/Ethane Mixture

| Velocity c (Mach) | T (° K)[3] | P/P$_o$ | Partial Pressure (bar) | | Equilibrium Vapor Pressure (bar) | |
|---|---|---|---|---|---|---|
| | | | $C_3H_8$ | $C_2H_6$ | $C_3H_8$ | $C_2H_6$ |
| 1.0 | 272.3 | 0.547 | 2.30 | 9.19 | 4.5 | 25 |
| 1.2 | 257.3 | 0.428 | 1.78 | 7.19 | 3 | 17 |
| 1.4 | 241.9 | 0.328 | 1.38 | 5.51 | 1.5 | 12 |
| 1.6 | 226.3 | 0.246 | 1.03 | 4.20 | 0.8 | 7 |
| 1.8 | 210.6 | 0.180 | 0.76 | 3.02 | 0.35 | 4 |
| 2.0 | 195.6 | 0.131 | 0.55 | 2.20 | 0.15 | 2 |
| 2.5 | 161.5 | 0.057 | 0.24 | 0.96 | 0.01 | 0.25 |
| 3.0 | 133.0 | 0.025 | 0.11 | 0.42 | — | 0.02 |

[3]Initial temperature $T_o$ = 313° K.

EXAMPLE 3

Separation of C3 Hydrocarbons from a Hydroformylation Waste Gas Stream

A simulated process purge stream was examined in the supersonic separator model, where the stream contains the following gases, expressed in terms of mol % of the total: Hydrogen 43%, nitrogen 14%, carbon monoxide 13%, carbon dioxide 3%, methane 3%, ethane 0.5%, propane 21%, and propene 1.5%. Thus, about 86% of the hydrocarbon gases were C3 hydrocarbons (propane and propene). The process stream was simulated at 305 psig [21.03 bar (g)] and a flow rate of 40 thousand standard cubic feet per minute. Table 4 shows the C3 fraction recovery as a function of feed temperature. The C3 recovery is defined as mass fraction of C3s in liquid relative to the total C3s in feed. Each stage of C3 hydrocarbon separation from a supersonic gas stream was modeled in a bench-scale de Laval nozzle capable of a Mach 2 expansion.

TABLE 4

C3 Recovery from a Hydroformylation Waste Stream

| Feed Temperature (C.) | C3 Recovery (%) |
|---|---|
| 40 | 17 |
| 20 | 28 |
| 0 | 39 |

Table 4 shows that a reduction in feed temperature increases C3 recovery. Moreover, the concentration of C3s in the liquid hydrocarbons recovered from the liquid outlet of the de Laval nozzle was 99.9 mole %.

A second simulation was performed to study the effect of staging at a feed temperature of 20° C., where each stage involves passage through a de Laval nozzle. Only one additional stage of supersonic separation was used, as shown in Table 5. Table 5 shows that addition of a second nozzle in series results in improved C3 recovery. The overall mass flow rate in two stages is different, mainly due to reduced C3 mass in stage 2.

TABLE 5

Multistage C3 Recovery from a Hydroformylation Waste Stream

| Feed Temperature (degrees C.) | 20 |
|---|---|
| Hydrocarbon composition of Stage 1 feed | 86.5% C3; 13.5% C1 to C2 |
| C3 Recovery [Stage 1] (%) | 28 |
| Hydrocarbon composition of Stage 2 feed | 77.8% C3; 22.2% C1 to C2 |
| C3 Recovery [Stage 2] (%) | 37 |

The model demonstrates the effective recovery for C3 hydrocarbons in 2 stage of separation is ~50% to 55% for this simulated process stream, using two stages of supersonic separation in a de Laval nozzle. In the Example of Table 4, 28% of the C3 hydrocarbons in the initial feed are recovered as a liquid from stage 1. The non-condensed gas stream exiting the stage 1 de Laval nozzle serves as a feed stream for the stage 2 de Laval nozzle. In the second stage, 37% of the C3 hydrocarbons in the stage 2 feed are recovered as a liquid, for a total recovery from stages 1 and 2 of 53% of the C3 hydrocarbons in the initial feed. In principle, recovery can be further enhanced through the use of three, four, or more de Laval nozzles in series.

EXAMPLE 4

Separation of Butane from a Propane/Butane Mixture (Initial Pressure: 21 Bar)

Separation of butane from a mixture of propane gas and butane gas at an initial pressure of 21 bar, and an initial temperature of 373° K may be accomplished in a de Laval nozzle, under the proper conditions. The gas mixture contains 20 mol % butane at partial pressure $P_1$ and 80 mol % propane at partial pressure $P_2$; by the relationship $P=P_1+P_2$, the mixture under these initial conditions contains propane at a partial pressure of 16.8 bar and butane at a partial pressure of 4.2 bar, where, the term γ is assumed to be substantially constant at ~1.3.

Figure 5C:
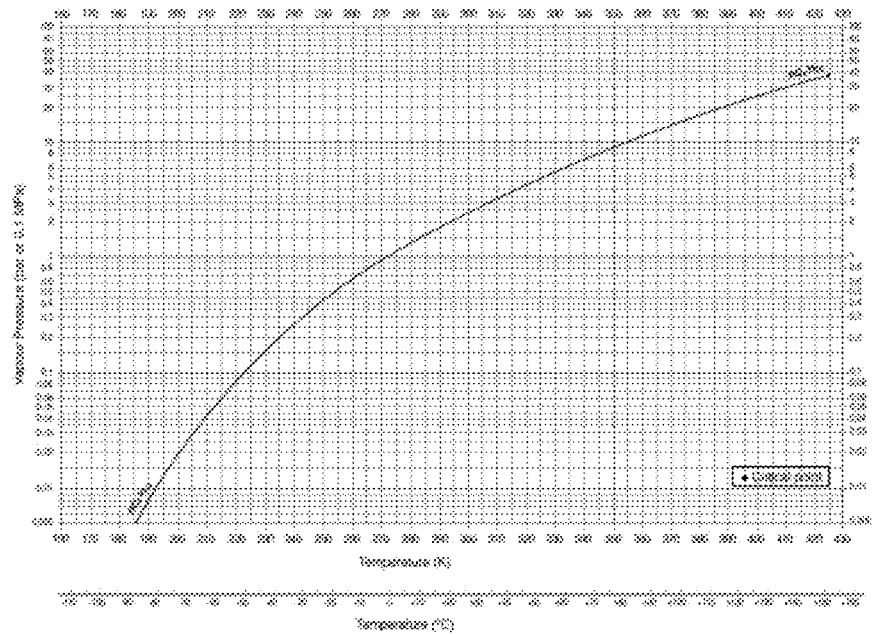
FIG. 5C shows the equilibrium vapor pressure of butane as a function of temperature.
Figure 8:
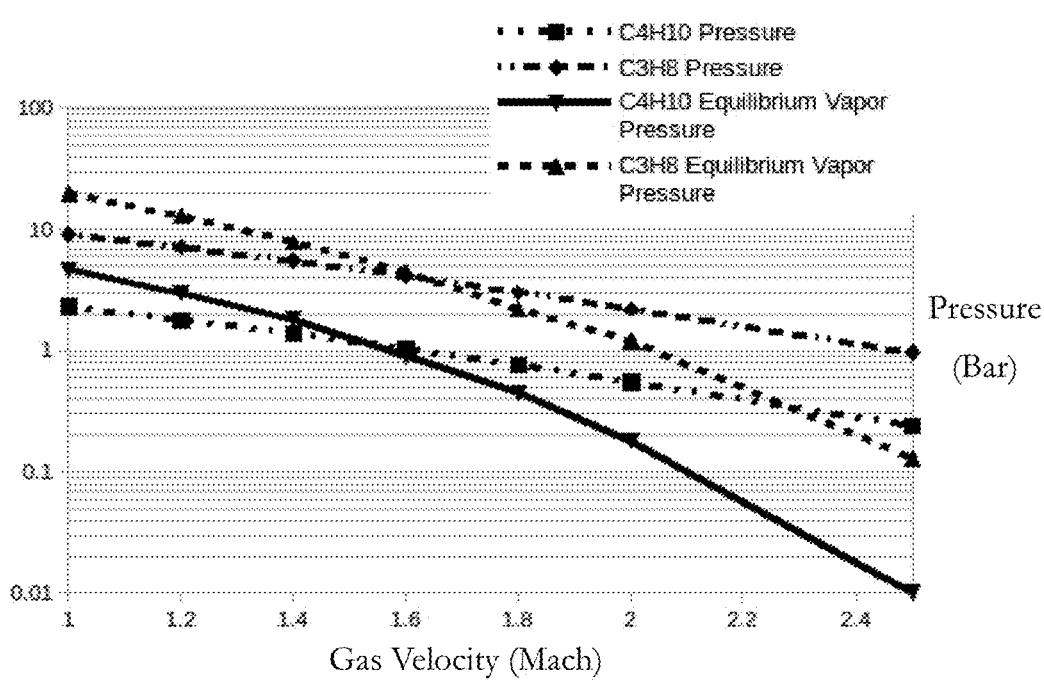
FIG. 8 shows condensation of butane from a 20:80 butane/propane mixture in a de Laval nozzle, where butane begins condensation at Mach ~1.5 and propane begins condensation at Mach ~1.6.

FIG. 5A and FIG. 5C shows the equilibrium vapor pressures of propane and butane (bar), respectively, as a function of temperature (degrees K). Table 6 presents the change in temperature and partial pressures as the propane/butane gas mixture accelerates from Mach 1, at the nozzle throat, to Mach 2.5. At the nozzle throat (Gas velocity c=Mach 1), the partial pressures of butane and propane in the vapor stream are each less than the equilibrium vapor pressure. At Mach 1.6, the partial pressure of butane in the vapor stream exceeds the equilibrium vapor pressure of propane, and butane begins to condense from the vapor stream as liquid droplets. At Mach 1.8, the partial pressure of propane in the vapor stream exceeds the equilibrium vapor pressure of propane, and propane condenses. This is shown in the graph in FIG. 8. Under these conditions, it is difficult to achieve good separation between propane and butane in a de Laval nozzle.

TABLE 6

Partial Pressure (Bar) in a Butane (20 mol %)/Propane (80 mol %) Mixture

| Velocity (Mach) | T (° K)[4] | P/P$_o$ | Partial Pressure (bar) C$_4$H$_{10}$ | Partial Pressure (bar) C$_3$H$_8$ | Equilibrium Vapor Pressure (bar) C$_4$H$_{10}$ | Equilibrium Vapor Pressure (bar) C$_3$H$_8$ |
|---|---|---|---|---|---|---|
| 1.0 | 324.5 | 0.547 | 2.30 | 9.19 | 4.7 | 20 |
| 1.2 | 306.6 | 0.428 | 1.78 | 7.19 | 3 | 13 |
| 1.4 | 288.3 | 0.328 | 1.38 | 5.51 | 1.8 | 8 |
| 1.6 | 269.7 | 0.246 | 1.03 | 4.20 | 0.9 | 4.5 |
| 1.8 | 251.0 | 0.180 | 0.76 | 3.02 | 0.45 | 2.2 |
| 2.0 | 233.1 | 0.131 | 0.55 | 2.20 | 0.18 | 1.2 |
| 2.5 | 192.5 | 0.057 | 0.24 | 0.96 | 0.01 | 0.13 |

[4]Initial temperature T$_o$ = 373° K.

Improved separation can be achieved by manipulating the conditions of gas concentration and gas pressure. For example, a mixture of propane gas and butane gas at an initial pressure of 21 bar, and an initial temperature of 373° K, may be separated if the amount of butane in the gas mixture is increased. For example, a gas mixture containing 35 mol % butane at partial pressure P$_1$ and 65 mol % propane at partial pressure P$_2$ may be separated.

Figure 9:
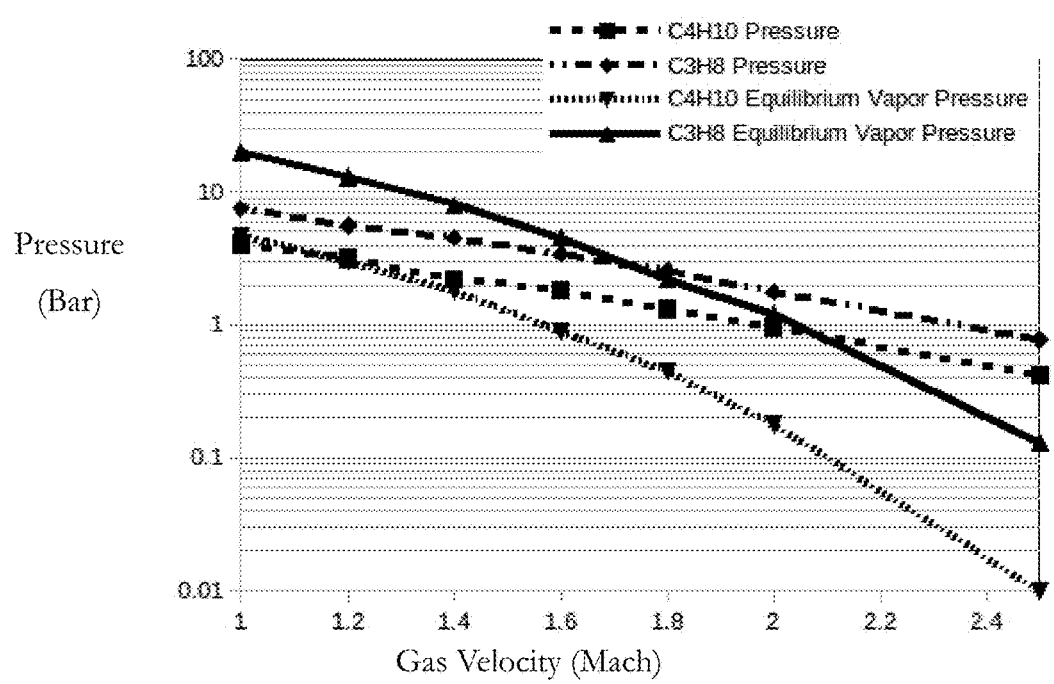
FIG. 9 shows condensation of butane from a 35:65 butane/propane mixture in a de Laval nozzle, where butane begins condensation at Mach 1.1 to 1.2 and propane begins condensation at Mach ~1.9.

Table 7 presents the change in temperature and partial pressures as the 65% propane/35% butane gas mixture accelerates from Mach 1, at the nozzle throat, to Mach 2.5. At Mach 1.2, the partial pressure of butane in the vapor stream exceeds the equilibrium vapor pressure of butane, and butane begins to condense from the vapor stream as liquid droplets, as shown in FIG. 9. Propane does not begin to condense until nearly Mach 1.8. By increasing butane concentration in the vapor stream, it becomes possible to achieve good separation between propane and butane in a de Laval nozzle.

TABLE 7

Partial Pressure (Bar) in a Butane (35 mol %)/Propane (65 mol %) Mixture

| Velocity (Mach) | T (° K)[5] | P/P$_o$ | Partial Pressure (bar) C$_4$H$_{10}$ | Partial Pressure (bar) C$_3$H$_8$ | Equilibrium Vapor Pressure (bar) C$_4$H$_{10}$ | Equilibrium Vapor Pressure (bar) C$_3$H$_8$ |
|---|---|---|---|---|---|---|
| 1.0 | 324.5 | 0.547 | 4.04 | 7.51 | 4.7 | 20 |
| 1.2 | 306.6 | 0.428 | 3.16 | 5.60 | 3 | 13 |
| 1.4 | 288.3 | 0.328 | 2.22 | 4.50 | 1.8 | 8 |
| 1.6 | 269.7 | 0.246 | 1.83 | 3.41 | 0.9 | 4.5 |
| 1.8 | 251.0 | 0.180 | 1.32 | 2.55 | 0.45 | 2.2 |
| 2.0 | 233.1 | 0.131 | 0.96 | 1.77 | 0.18 | 1.2 |
| 2.5 | 192.5 | 0.057 | 0.42 | 0.78 | 0.01 | 0.13 |

[5]Initial temperature T$_o$ = 373° K.

EXAMPLE 5

Preparation of an Enriched Propene Stream from a Propane/Propene Mixture (Initial Pressure: 20 Bar; Initial Temperature: 373 K)

Figure 5D:
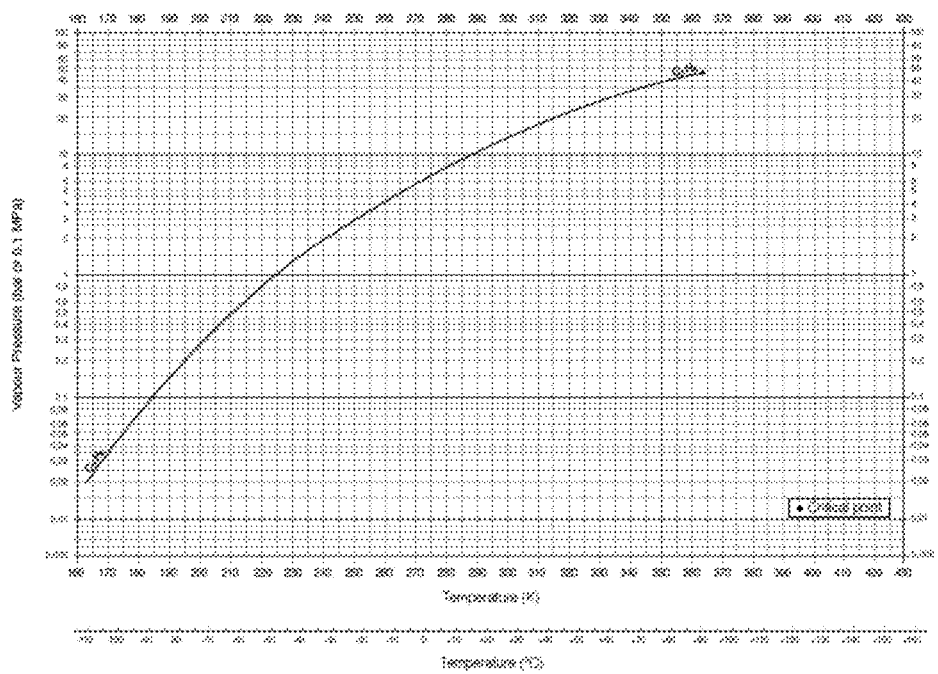
FIG. 5D shows the equilibrium vapor pressure of propene as a function of temperature.

A mixture of propane gas and butane gas at an initial pressure of 20 bar, and an initial temperature of 373 K, may be processed in a de Laval nozzle, to produce a stream of hydrocarbon gas which is enriched in propene, relative to the initial mixture. FIG. 5A and FIG. 5D show the equilibrium vapor pressures of propane and butane (bar), respectively, as a function of temperature (degrees K). The initial gas mixture contains 65 mol. % propene at partial pressure P1, and 35 mol % propane at partial pressure P2; by the relationship P=P1+P2, the mixture under these initial conditions contains propene at a partial pressure of 13 bar and propane at a partial pressure of 7 bar, where, the term γ is assumed to be substantially constant at ~1.3.

Figure 10:
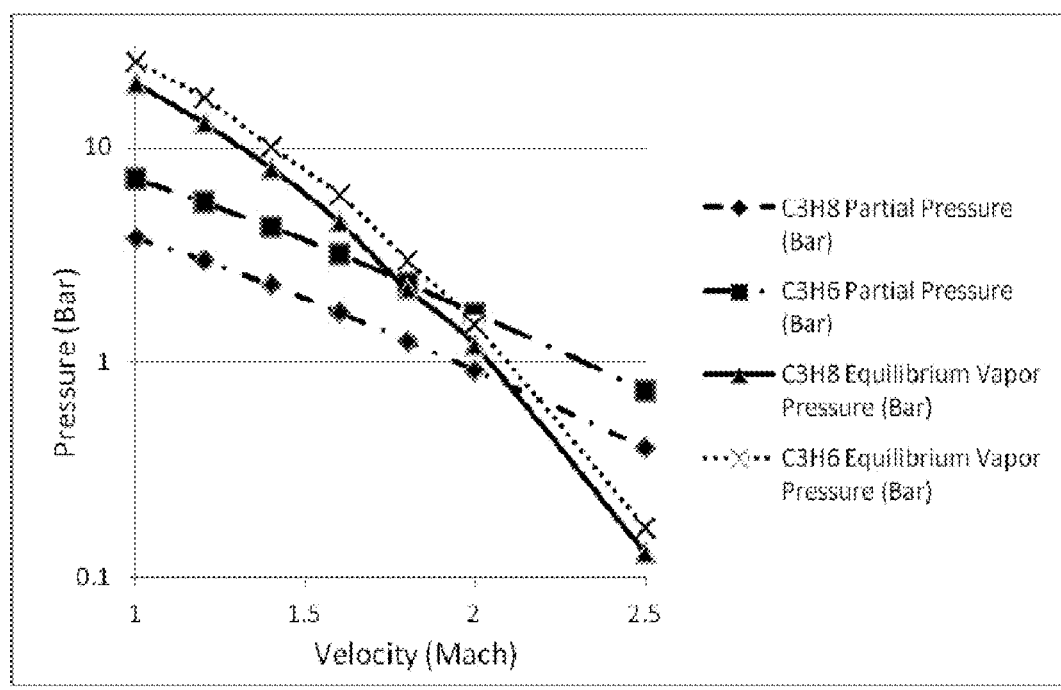
FIGS. 10-13 show condensation of propene from various propene/propane mixture in a de Laval nozzle.

Table 8 presents the change in temperature and partial pressures as the propane/propene gas mixture accelerates from Mach 1, at the nozzle throat, to Mach 2.5. At the nozzle throat (Gas velocity c=Mach 1), the partial pressures of propene and propane in the vapor stream are each less than their respective equilibrium vapor pressures. At Mach 2, the partial pressure of propene in the vapor stream exceeds the equilibrium vapor pressure of propene, and propene begins to condense from the vapor stream as liquid droplets. However, at Mach 2, the partial pressure of propane in the vapor stream is below the equilibrium vapor pressure of propane, and there is no driving force for condensation of propane. At Mach 2.5, the partial pressures of both propane and propene in the vapor stream exceed their respective equilibrium vapor pressures, and each hydrocarbon gas condenses. This is shown in the graph of FIG. 10.

Under these conditions, it may be difficult to achieve good separation between propane and butane in a de Laval nozzle. However, the driving force for propene condensation is greater than the driving force for propane condensation. Therefore, the liquid condensate recovered as the gas stream accelerates to between Mach 2 and Mach 2.5 will be enriched in propene, relative to the initial gas mixture.

TABLE 8

Partial Pressure (Bar) in a Propene (65 mol %)/Propane (35 mol %) Mixture (T$_o$ = 373 K)

| Velocity (Mach) | T (° K) | P/P$_o$ | Partial Pressure (bar) C$_3$H$_8$ | Partial Pressure (bar) C$_3$H$_6$ | Equilibrium Vapor Pressure (bar) C$_3$H$_8$ | Equilibrium Vapor Pressure (bar) C$_3$H$_6$ |
|---|---|---|---|---|---|---|
| 1 | 324.5 | 0.547 | 3.83 | 7.11 | 20 | 25 |
| 1.2 | 306.6 | 0.428 | 3.00 | 5.56 | 13 | 17 |
| 1.4 | 288.3 | 0.328 | 2.30 | 4.26 | 8 | 10 |
| 1.6 | 269.7 | 0.246 | 1.72 | 3.20 | 4.5 | 6 |
| 1.8 | 251 | 0.18 | 1.26 | 2.34 | 2.2 | 3 |
| 2 | 233.1 | 0.131 | 0.92 | 1.70 | 1.2 | 1.5 |
| 2.5 | 192.5 | 0.057 | 0.40 | 0.74 | 0.13 | 0.17 |

EXAMPLE 6

Preparation of an Enriched Propene Stream from a Propane/Propene Mixture (Initial Pressure: 20 Bar; Initial Temperature: 333 K)

A mixture of propane gas and propene gas at an initial pressure of 20 bar, and an initial temperature of 333 K, may be processed in a de Laval nozzle, to produce a stream of hydrocarbon gas which is enriched in propene, relative to the initial mixture. The initial gas mixture contains 65 mol. % propene at partial pressure P1, and 35 mol % propane at partial pressure P2; by the relationship P=P1+P2, the mixture under these initial conditions contains propene at a partial pressure of 13 bar and propane at a partial pressure of 7 bar, where the term γ is assumed to be substantially constant at ~1.3.

Figure 11:
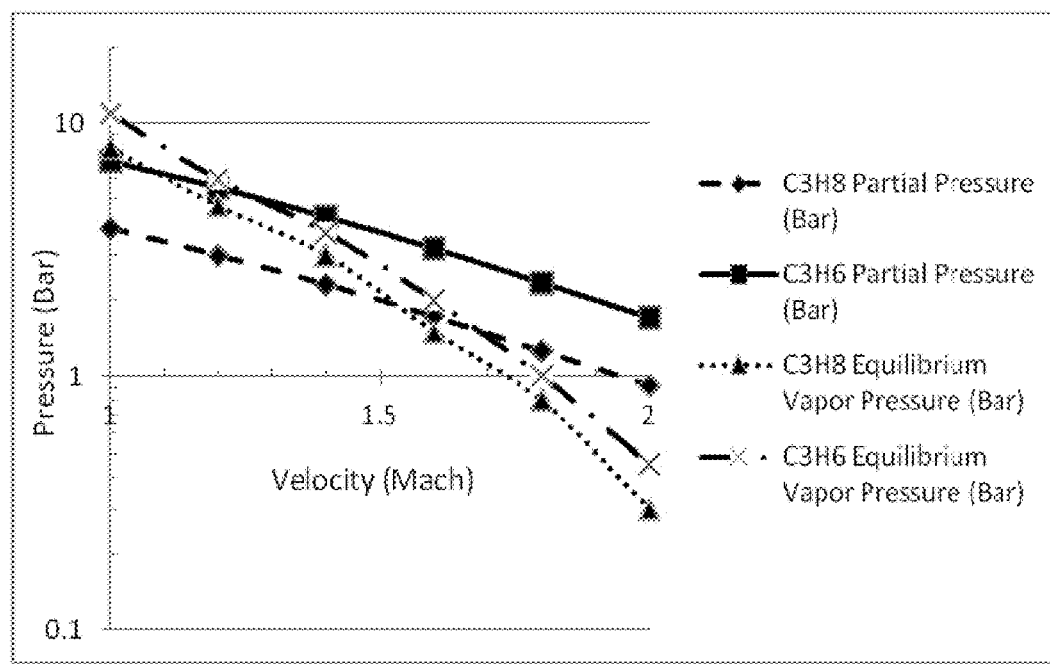

Table 9 presents the change in temperature and partial pressures as the propane/propene gas mixture accelerates from Mach 1, at the nozzle throat, to Mach 2. At the nozzle throat (Gas velocity c=Mach 1), the partial pressures of propene and propane in the vapor stream are each less than their respective equilibrium vapor pressures. At Mach 1.4, the partial pressure of propene in the vapor stream exceeds the equilibrium vapor pressure of propene, and propene begins to condense from the vapor stream as liquid droplets. However, at Mach 1.4, the partial pressure of propane in the vapor stream is below the equilibrium vapor pressure of propane, and there is no driving force for condensation of propane. At Mach 1.6, the partial pressures of both propane and propene in the vapor stream exceed their respective equilibrium vapor pressures, and each hydrocarbon gas condenses. However, the difference between the partial pressure of propene and the equilibrium vapor pressure of propene ($\Delta P_1$) consistently exceeds the difference between the partial pressure and the equilibrium vapor pressure of propane ($\Delta P_2$). This is shown in the graph of FIG. 11.

Therefore, the driving force for propene condensation is greater than the driving force for propane condensation as the gas stream accelerates from Mach 1.4 to Mach 2. Therefore, the liquid condensate recovered from the accelerating gas stream will be enriched in propene, relative to the initial gas mixture.

TABLE 9

Partial Pressure (Bar) in a Propylene (65 mol %)/ Propane (35 mol %) Mixture ($T_o$ = 333 K)

| Velocity | | | Partial Pressure (bar) | | Equilibrium Vapor Pressure (bar) | |
|---|---|---|---|---|---|---|
| (Mach) | T (° K) | P/P$_o$ | C$_3$H$_8$ | C$_3$H$_6$ | C$_3$H$_8$ | C$_3$H$_6$ |
| 1 | 290 | 0.547 | 3.83 | 7.11 | 8 | 11 |
| 1.2 | 273 | 0.428 | 3.00 | 5.56 | 4.5 | 6 |
| 1.4 | 257 | 0.328 | 2.30 | 4.26 | 3 | 3.7 |
| 1.6 | 241 | 0.246 | 1.72 | 3.20 | 1.5 | 2 |
| 1.8 | 224 | 0.18 | 1.26 | 2.34 | 0.8 | 1 |
| 2 | 208 | 0.131 | 0.92 | 1.70 | 0.3 | 0.45 |

EXAMPLE 7

Preparation of an Enriched Propene Stream from a Propane/Propene Mixture (Initial Pressure: 20 Bar; Initial Temperature: 373 K)

An mixture of 80 mol % propene gas and 20 mol % propane gas at an initial pressure of 20 bar, and an initial temperature of 373 K, may be processed in a de Laval nozzle, to produce a stream of hydrocarbon gas which is enriched in propene, relative to the initial 80:20 mixture. The initial mixture under these initial conditions contains propene at a partial pressure of 16 bar and propane at a partial pressure of 4 bar, where the term γ is assumed to be substantially constant at ~1.3.

Figure 12:
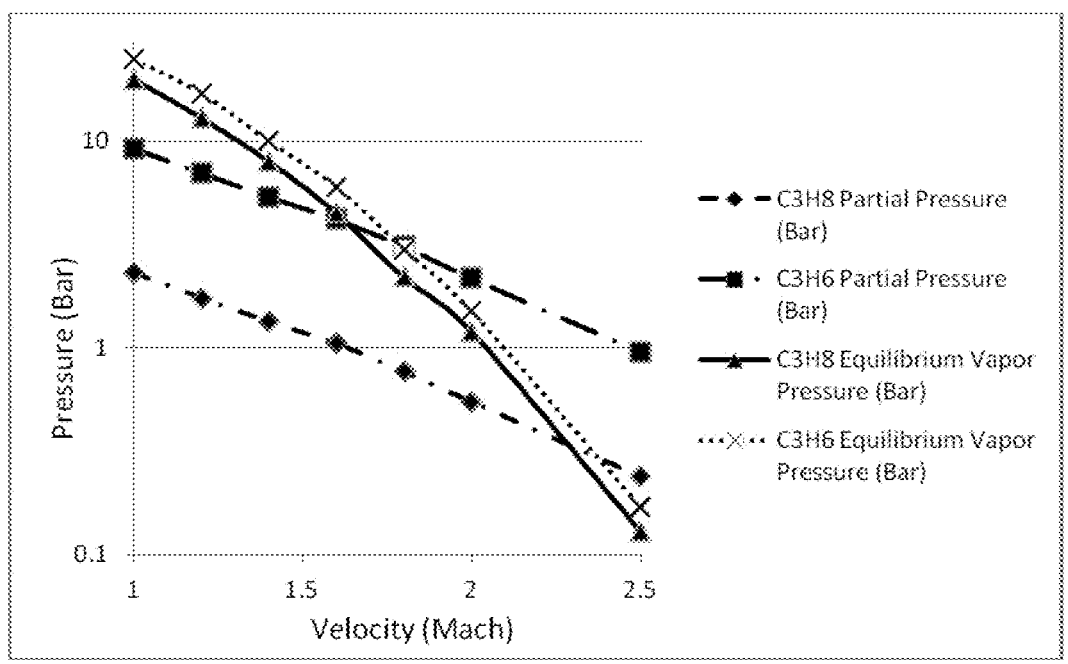

Table 10 presents the change in temperature and partial pressures as the propane/propene gas mixture accelerates from Mach 1, at the nozzle throat, to Mach 2.5. At the nozzle throat (Gas velocity c=Mach 1), the partial pressures of propene and propane in the vapor stream are each less than their respective equilibrium vapor pressures. At Mach 1.8, the partial pressure of propene in the vapor stream exceeds the equilibrium vapor pressure of propene, and propene begins to condense from the vapor stream as liquid droplets. At Mach 2.5, the partial pressure of both propane and propene in the vapor stream exceed their respective equilibrium vapor pressures, and each hydrocarbon gas condenses. However, as the gas accelerates from Mach 1.8 to past Mach 2, the partial pressure of propane is less than its equilibrium vapor pressure, and only propene condenses. Therefore, the liquid condensate recovered from the accelerating 80:20 propene/propane gas stream is significantly enriched in propene, relative to the initial gas mixture. This is shown in the graph of FIG. 12.

TABLE 10

Partial Pressure (Bar) in a Propylene (80 mol %)/ Propane (20 mol %) Mixture (Initial Pressure: 20 bar; Initial Temperature: 373 K)

| Velocity | | | Partial Pressure (bar) | | Equilibrium Vapor Pressure (bar) | |
|---|---|---|---|---|---|---|
| (Mach) | T (° K) | P/P$_o$ | C$_3$H$_8$ | C$_3$H$_6$ | C$_3$H$_8$ | C$_3$H$_6$ |
| 1 | 324.5 | 0.547 | 2.31 | 9.24 | 20 | 25 |
| 1.2 | 306.6 | 0.428 | 1.75 | 7.01 | 13 | 17 |
| 1.4 | 288.3 | 0.328 | 1.34 | 5.38 | 8 | 10 |
| 1.6 | 269.7 | 0.246 | 1.05 | 4.19 | 4.5 | 6 |
| 1.8 | 251 | 0.18 | 0.77 | 3.10 | 2.2 | 3 |
| 2 | 233.1 | 0.131 | 0.55 | 2.18 | 1.2 | 1.5 |
| 2.5 | 192.5 | 0.057 | 0.24 | 0.96 | 0.13 | 0.17 |

EXAMPLE 8

Preparation of an Enriched Propene Stream from a Propane/Propene Mixture (Initial Pressure: 20 Bar; Initial Temperature: 333 K)

Figure 13:
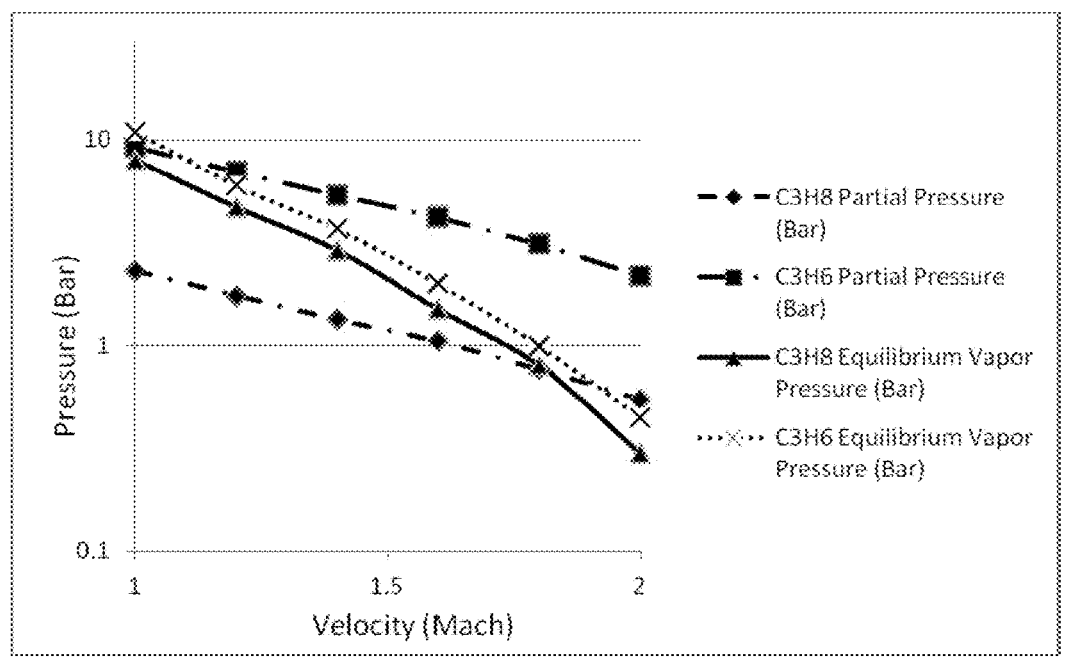

Table 11 demonstrates that a reduction in initial temperature enhances separation between propane and propene as an 80:20 propane/propene gas mixture accelerates through a de Laval nozzle, at a starting temperature of 333 K. At the nozzle throat (Gas velocity c=Mach 1), the partial pressures of propene and propane in the vapor stream are each less than their respective equilibrium vapor pressures. At Mach 1.2, the partial pressure of propene in the vapor stream exceeds the equilibrium vapor pressure of propene, and propene begins to condense from the vapor stream as liquid droplets. At Mach 1.8, the partial pressure of propane is approximately equal to its equilibrium vapor pressure, and little or no propane condensation occurs. However, as the gas accelerates to Mach 2, the partial pressures of propane and propene are each greater than their respective equilibrium vapor pressures, and both propene and propane condense. However, even at Mach 2, the difference between the partial pressure of propene and the equilibrium vapor pressure of propene ($\Delta P_1$) is much larger than the difference between the partial pressure and the equilibrium vapor pressure of propane ($\Delta P_2$). Therefore, good separation may be achieved in a de Laval nozzle capable of accelerating a hydrocarbon gas to Mach 2. This is shown in the graph of FIG. 13.

TABLE 11

Partial Pressure (Bar) in a Propylene (80 mol %)/
Propane (20 mol %) Mixture (Initial Pressure: 20 bar;
Initial Temperature: 333 K)

| Velocity (Mach) | T (° K) | P/P$_o$ | Partial Pressure (bar) | | Equilibrium Vapor Pressure (bar) | |
|---|---|---|---|---|---|---|
| | | | $C_3H_8$ | $C_3H_6$ | $C_3H_8$ | $C_3H_6$ |
| 1 | 324.5 | 0.547 | 2.31 | 9.24 | 8 | 11 |
| 1.2 | 306.6 | 0.428 | 1.75 | 7.01 | 4.5 | 6 |
| 1.4 | 288.3 | 0.328 | 1.34 | 5.38 | 3 | 3.7 |
| 1.6 | 269.7 | 0.246 | 1.05 | 4.19 | 1.5 | 2 |
| 1.8 | 251 | 0.18 | 0.77 | 3.10 | 0.8 | 1 |
| 2 | 233.1 | 0.131 | 0.55 | 2.18 | 0.3 | 0.45 |

EXAMPLE 9

Drying of a Propane Stream Containing 1.5% Water (Initial Pressure: 11 Bar)

Water may be separated from a propane gas stream using a de Laval nozzle. As an example, a propane stream containing 1.5% by volume water vapor may be accelerated through a de Laval nozzle, where the propane stream is at an initial pressure of 11 bar, and an initial temperature of 373° K. The gas mixture contains 1.5 mol % water at partial pressure $P_1$, and 98.5 mol % propane at partial pressure $P_2$; by the relationship $P=P_1+P_2$, the mixture under these initial conditions contains water at a partial pressure of 0.17 bar and propane at a partial pressure of 10.83 bar, where the term γ is assumed to be substantially constant at ~1.3.

Table 12 presents the change in temperature and partial pressures as the propane/water vapor gas mixture accelerates from Mach 1, at the nozzle throat, to Mach 2.5. At the nozzle throat (Gas velocity c=Mach 1), the partial pressures of water and propane in the vapor stream are each less than the equilibrium vapor pressure. At Mach 1.2, the partial pressure of water in the vapor stream exceeds the equilibrium water vapor pressure, and liquid water begins to condense from the vapor stream. Under these conditions, the partial pressure of propane in the vapor stream exceeds the equilibrium propane vapor pressure at about Mach 2, and propane condenses. Under these conditions, it is easy to remove substantially all water from a moist propane stream.

TABLE 12

Partial Pressure (Bar) in a Water (1.5 mol %)/
Propane (98.5 mol %) Mixture (Initial Pressure: 11 bar)

| Velocity (Mach) | T (° K)[6] | P/P$_o$ | Partial Pressure (bar) | | Equilibrium Vapor Pressure (bar) | |
|---|---|---|---|---|---|---|
| | | | $H_2O$ | $C_3H_8$ | $H_2O$ | $C_3H_8$ |
| 1.0 | 324.5 | 0.547 | 0.088 | 5.92 | 0.132 | 20 |
| 1.2 | 306.6 | 0.428 | 0.073 | 4.62 | 0.052 | 13 |
| 1.4 | 288.3 | 0.328 | 0.052 | 3.55 | 0.017 | 8 |
| 1.6 | 269.7 | 0.246 | 0.042 | 2.65 | 0.005 | 4.5 |
| 1.8 | 251.0 | 0.180 | 0.031 | 1.94 | 0.001 | 2.2 |
| 2.0 | 233.1 | 0.131 | 0.021 | 1.41 | 0.0002 | 1.2 |
| 2.5 | 192.5 | 0.057 | 0.010 | 0.61 | — | 0.13 |

[6]Initial temperature $T_o$ = 373° K.

EXAMPLE 10

Propene Recovery from a Hydrocarbon Stream Containing Butyraldehydes (Initial Pressure: 31.7 Bar)

A simulated process purge stream was modeled in a de Laval nozzle, where the process stream was a hydroformylation purge stream. The purge stream contained the following molar composition:
propane 20%,
propene 58%,
hydrogen 8%,
carbon monoxide 3%,
argon 1%,
methane 3%, and
n-butyraldehyde 4%.

The stream was evaluated in the supersonic separator model, with an initial pressure of 305 psig [21 bar (g)] and 313° K with a flow rate of 40 thousand standard cubic feet per minute. Both C3 hydrocarbons (propane and propene) and butyraldehyde were recovered in the condensed liquid phase, with a total C3 hydrocarbon recovery of 24% and a total butyraldehyde of 99.8%. The C3 liquid phase was therefore contaminated with butyraldehyde, and had a purity of ~71%. Thus, it is difficult to prepare a pure C3 hydrocarbon phase by condensation in a de Laval nozzle in the presence of a high-boiling condensable vapor, such as butyraldehyde (boiling point: 348° K). In such a situation, the recovered C3 hydrocarbons may be separated from high-boiling material in the liquid phase by distillation after supersonic separation in the de Laval nozzle. Alternatively, the high-boiling contaminants can be condensed from the hydroformylation purge stream prior to supersonic separation.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:
1. A method of at least partially separating a first hydrocarbon from a mixture of said first hydrocarbon and a second hydrocarbon, wherein said mixture has a defined critical pressure,
said method comprising:
passing a gas stream comprising said mixture into an inlet of a de Laval nozzle having a throat, said gas stream having an initial temperature of between −100° C. and 150° C. and an initial pressure of between 200 psig and said critical pressure;
expanding the gas stream after the gas stream passes through the throat of the de Laval nozzle, producing a reduced-temperature gas stream;
condensing a first enriched liquid from the reduced-temperature gas stream, wherein said first enriched liquid is enriched in said first hydrocarbon, relative to said mixture; and
recovering the first enriched liquid from said reduced-temperature gas stream;

wherein said mixture comprises between 60% by volume and 90% by volume of said first hydrocarbon, and between 10% by volume and 40% by volume of said second hydrocarbon; and wherein said first hydrocarbon has a first boiling point $T_1$ at atmospheric pressure and said second hydrocarbon has a second boiling point $T_2$ at atmospheric pressure; wherein $T_1 \leq T_2 \leq T_1+15$ K.

2. The method of claim 1, wherein:
said mixture of said first hydrocarbon and said second hydrocarbon further comprises a non-condensable gas; and
wherein said method further comprises a step of separating said non-condensable gas from said mixture of said first hydrocarbon and said second hydrocarbon prior to passing the gas stream comprising said mixture into the inlet of the de Laval nozzle.

3. The method of claim 2, wherein said non-condensable gas is hydrogen, and
wherein said step of separating said non-condensable gas from said mixture of said first hydrocarbon and said second hydrocarbon comprises using a hydrogen-selective membrane.

4. The method of claim 1, wherein $T_1 \leq T_2 \leq T_1+10$ K.

5. The method of claim 4, wherein said first hydrocarbon is propene and said second hydrocarbon is propane.

6. The method of claim 1, further comprising:
vaporizing said first enriched liquid to produce a vapor stream enriched in said first hydrocarbon;
passing said enriched vapor stream into an inlet of a second de Laval nozzle, said enriched vapor stream having an initial temperature of between −100° C. and 150° C. and an initial pressure of between 200 psig and a critical pressure of said enriched vapor stream;
expanding the enriched vapor stream after the enriched vapor stream passes through a throat of the second de Laval nozzle, producing a reduced-temperature enriched gas stream;
condensing a second enriched liquid from the reduced-temperature enriched gas stream, wherein said second enriched liquid is enriched in said first hydrocarbon, relative to said enriched vapor stream; and
recovering the second enriched liquid from said reduced-temperature enriched gas stream.

7. The method of claim 1, further comprising:
recovering the reduced-temperature gas stream from an exit of the de Laval nozzle;
passing said recovered gas stream into an inlet of a second de Laval nozzle, said recovered gas stream having an initial temperature of between −100° C. and 150° C. and an initial pressure of between 200 psig and a critical pressure of said recovered gas stream;
expanding the recovered gas stream after the recovered gas stream passes through a throat of the second de Laval nozzle, producing a reduced-temperature recovered gas stream;
condensing a second enriched liquid from the reduced-temperature recovered gas stream, wherein said second enriched liquid is enriched in said first hydrocarbon, relative to said reduced-temperature gas stream; and
recovering the second enriched liquid from said reduced-temperature recovered gas stream.

8. The method of claim 7, further comprising:
recovering the reduced-temperature recovered gas stream from an exit of the second de Laval nozzle;
passing said reduced-temperature recovered gas stream from the second de Laval nozzle into an inlet of a third de Laval nozzle, said reduced-temperature recovered gas stream having an initial temperature of between −100° C. and 150° C. and an initial pressure of between 200 psig and a critical pressure of said recovered gas stream;
expanding the reduced-temperature recovered gas stream after the reduced-temperature recovered gas stream passes through a throat of the third de Laval nozzle;
condensing a third enriched liquid from the reduced-temperature recovered gas stream in the third de Laval nozzle, wherein said third enriched liquid is enriched in said first hydrocarbon, relative to said reduced-temperature gas stream; and
recovering the third enriched liquid from said reduced-temperature recovered gas stream.

9. The method of claim 8, further comprising:
combining said first enriched liquid and said third enriched liquid; and
vaporizing the
combination of said first enriched liquid and said third enriched liquid to produce a vapor stream enriched in said first hydrocarbon.

10. The method of claim 1, wherein the first enriched liquid comprises said first hydrocarbon and said second hydrocarbon, said method further comprising:
fractionating said first enriched liquid to produce a first stream comprising between 95% by volume and 100% by volume of said first hydrocarbon, and a second stream comprising said second hydrocarbon.

11. The method of claim 10, wherein said first hydrocarbon has a lower boiling point than said second hydrocarbon, and
wherein said fractionating comprises distilling said first enriched liquid to produce an overhead gas stream enriched in said first hydrocarbon and a bottoms stream enriched in said second hydrocarbon.

12. The method of claim 10, wherein said fractionating comprises selectively adsorbing one of said first and second hydrocarbons onto a molecular sieve.

13. The method of claim 1, wherein the reduced-temperature gas stream is recovered from an exit of the de Laval nozzle, and recycled to said gas stream comprising said mixture.

14. The method of claim 10, wherein a portion of the first stream is recovered, and recycled to said gas stream comprising said mixture.

15. A method of at least partially separating propene from a mixture of between 60% by volume and 90% by volume of said propene and between 10% by volume and 40% by volume of propane, said method comprising:
partially separating propene from said mixture by distillation or selective adsorption onto a molecular sieve; and
passing a gas stream comprising said partially separated propene into an inlet of a de Laval nozzle having a throat, said gas stream having an initial temperature of between −100° C. and 150° C. and an initial pressure of between 200 psig and a critical pressure;
expanding the gas stream after the gas stream passes through the throat of the de Laval nozzle, producing a reduced-temperature gas stream;
condensing a liquid enriched in propene, relative to said gas stream, from the reduced-temperature gas stream; and
recovering the liquid enriched in propene from said reduced-temperature gas stream.

16. The method of claim 15, wherein:
said mixture further comprises hydrogen; and
wherein said method further comprises a step of separating said hydrogen from said mixture prior to passing the gas stream comprising said mixture into the inlet of the de Laval nozzle.

17. The method of claim 15, wherein said partially separating propene comprises distillation to produce an overhead gas stream enriched in propene and a bottoms stream enriched in propane.

18. The method of claim 15, wherein said partially separating propene comprises selectively adsorbing propene onto a zeolite molecular sieve or a carbon molecular sieve, and
desorbing said adsorbed propene to produce said gas stream comprising said partially separated propene.

19. The method of claim 15, wherein the reduced-temperature gas stream is recovered from an exit of the de Laval nozzle, and recycled to said step of partially separating propene.

* * * * *